US010943599B2

United States Patent
Mitic et al.

(10) Patent No.: US 10,943,599 B2
(45) Date of Patent: Mar. 9, 2021

(54) AUDIO CANCELLATION FOR VOICE RECOGNITION

(71) Applicant: Spotify AB, Stockholm (SE)

(72) Inventors: Richard Mitic, Stockholm (SE); Robert Swain, Stockholm (SE); Daniel Bromand, Stockholm (SE); Wagar Sheikh, Malmo (SE); James Robert Stansfield, Flyinge (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/593,539

(22) Filed: Oct. 4, 2019

(65) Prior Publication Data
US 2020/0135224 A1 Apr. 30, 2020

Related U.S. Application Data

(60) Provisional application No. 62/820,762, filed on Mar. 19, 2019.

(30) Foreign Application Priority Data

Oct. 26, 2018 (EP) ..................................... 18202941

(51) Int. Cl.
*G10L 21/0232* (2013.01)
*G10L 25/51* (2013.01)
*H04R 3/00* (2006.01)
*G10L 15/20* (2006.01)
*G10L 15/22* (2006.01)

(52) U.S. Cl.
CPC .......... *G10L 21/0232* (2013.01); *G10L 25/51* (2013.01); *H04R 3/00* (2013.01);
(Continued)

(58) Field of Classification Search
CPC ....... G10K 11/17823; G10K 11/17873; G10K 2210/12; G10K 2210/3031;
(Continued)

(56) References Cited

U.S. PATENT DOCUMENTS 7,881,460 B2  2/2011  Looney et al.
8,503,669 B2  8/2013  Mao
(Continued)

FOREIGN PATENT DOCUMENTS

JP   04-355549 A   12/1992
JP   11-234176 A   8/1999
WO  2017/039575 A1   3/2017

OTHER PUBLICATIONS

Malcolm Owen "A deep dive into HomePod's adaptive audio, beamforming and why it needs an A8 processor", Apple Insider, 14 pages (Jan. 26, 2018). Available Online at: https://appleinsider.com/articles/18/01/27/a-deep-dive-into-homepods-adaptive-audio-beamforming-and-why-it-needs-an-a8-processor.
(Continued)

*Primary Examiner* — Vivian C Chin
*Assistant Examiner* — Friedrich Fahnert
(74) *Attorney, Agent, or Firm* — Merchant & Gould P.C.

(57) ABSTRACT

An audio cancellation system includes a voice enabled computing system that is connected to an audio output device using a wired or wireless communication network. The voice enabled computing device can provide media content to a user and receive a voice command from the user. The connection between the voice enabled computing system and the audio output device introduces a time delay between the media content being generated at the voice enabled computing device and the media content being reproduced at the audio output device. The system operates to determine a calibration value adapted for the voice enabled computing system and the audio output device. The system uses the calibration value to filter the user's voice command from a recording of ambient sound including the media content, without requiring significant use of memory and computing resources.

20 Claims, 15 Drawing Sheets

(52) U.S. Cl.
CPC ............. *G10L 15/20* (2013.01); *G10L 15/22* (2013.01); *G10L 2015/223* (2013.01); *H04R 2420/07* (2013.01)

(58) Field of Classification Search
CPC .......... G10K 2210/3216; H04R 29/001; H04R 2420/07; H04R 3/00; H04R 3/02; G10L 15/20; G10L 15/22; G10L 2015/223; G10L 21/0208; G10L 21/0232; G10L 21/0264; G10L 25/51; H04M 9/08
USPC ........ 381/17, 18, 56, 59, 66, 71.6, 104, 110, 381/309
See application file for complete search history.

(56) References Cited

U.S. PATENT DOCUMENTS

| | | | |
|---|---|---|---|
| 9,430,999 B2 | 8/2016 | Clemow | |
| 9,484,030 B1* | 11/2016 | Meaney | ................ H04R 3/005 |
| 9,633,671 B2 | 4/2017 | Giacobello et al. | |
| 2008/0082326 A1 | 4/2008 | Venkataraman et al. | |
| 2015/0271616 A1 | 9/2015 | Kechichian | |
| 2015/0371654 A1 | 12/2015 | Johnston et al. | |
| 2016/0275050 A1* | 9/2016 | Tanaka | ...................... G06F 3/16 |
| 2017/0245079 A1 | 8/2017 | Sheen et al. | |
| 2018/0225082 A1* | 8/2018 | An | ..................... G10K 11/1781 |
| 2018/0306890 A1* | 10/2018 | Vatcher | .................... G01S 3/86 |
| 2018/0314689 A1* | 11/2018 | Wang | ..................... G10L 15/22 |
| 2019/0028803 A1* | 1/2019 | Benattar | ................. H04S 7/304 |

OTHER PUBLICATIONS

Extended European Search Report from corresponding European Appl'n. No. 19 205 155.5, dated Dec. 13, 2019.
Communication pursuant to Article 94(3) EPC from corresponding European Appl'n. No. 19 205 155.5, dated Apr. 24, 2020.

* cited by examiner

AUDIO CANCELLATION FOR VOICE RECOGNITION

CROSS REFERENCE TO RELATED APPLICATIONS

This application claims priority to European Application No. 18202941.3, filed Oct. 26, 2018, and also claims the benefit of U.S. Provisional Application No. 62/820,762, filed Mar. 19, 2019, and are incorporated herein by reference. To the extent appropriate, a claim of priority is made to each of the above-disclosed applications.

BACKGROUND

A voice enabled device can receive a voice command from a user to perform various functions, such as playing audio. When audio is played using the voice enabled device or around the voice enabled device, a sound recorded using the voice enabled device may include not only the user's voice command but also the audio that is currently playing. In order for the voice enabled device to understand the voice command from the user, it is desirable to accurately cancel or reduce from the recording the ambient audio including the currently-playing audio.

SUMMARY

In general terms, the present disclosure is directed to audio cancellation for voice recognition. Various aspects are described in this disclosure, which include, but are not limited to, the following aspects.

One aspect is a method of audio cancellation. The method may include generating an audio cue and playing the audio cue through a sound system; generating a recording of sound using a microphone; detecting the audio cue in the recording; determining a time delay between the generation of the audio cue and the time that the audio cue was recorded in the recording; and using the calibration value to cancel audio from subsequent recordings. In certain examples, the method may further include storing a calibration value based on the time delay.

In certain examples, the sound system may include a computing device and an audio output device connected to the computing device via a wired or wireless communication network. The audio output device may operate to play the audio cue. The computing device may include the microphone. In certain examples, the computing device may be connected to the audio output device via Bluetooth. In certain examples, the computing device includes a voice-enabled media playback device.

In certain examples, the method may include transmitting time delay data to a server computing device. The time delay data may include the calibration value and information about at least one of the computing device and the audio output device.

In certain examples, the method may include transmitting media content through the sound system; retrieving a reference signal and the calibration value; generating a recording of sound using the microphone; and canceling a signal of the media content from the recording using the reference signal. The recording of sound may include a user voice query. The reference signal may be delayed based on the calibration value.

In certain examples, the method may include prior to playing the audio cue, generating an announcement that the computing device and the audio output device has been paired; and playing the announcement via the audio output device.

In certain examples, the audio cue may be played immediately after the computing device and the audio output device has been paired.

In certain examples, the method may include generating a second audio cue and playing the second audio cue through the sound system; generating a recording of sound using the microphone; detecting the second audio cue in the recording; determining a second time delay between the generation of the second audio cue and the time that the second audio cue was recorded in the recording; determining a second calibration value based on the second time delay; determining a difference between the calibration value and the second calibration value; determining whether the difference is within a threshold range; and upon determining that the difference is within the threshold range, maintaining the first calibration value.

In certain examples, the method may include, upon determining that the difference is not within the threshold range, storing the second calibration value, and using the second calibration value to cancel audio from subsequent recordings.

In certain examples, the audio cue may include a plurality of different tones, each tone played at a different time. In certain examples, a Goertzel analysis of the recording is performed based on the plurality of frequencies. In certain examples, the Goertzel analysis may include determining a time position of a peak for each tone frequency; measuring a time difference between the generation of the tone frequency and the recording of the tone frequency for each tone frequency; and computing a mean average of the time differences.

Another aspect is a media playback system. The system may include a sound system including a media playback device and an audio output device. The media playback device may operate to generate a media content signal. The audio output device may be configured to play media content using the media content signal. In certain examples, the sound system may operate to generate an audio cue using the media playback device; transmit the audio cue to the audio output device; play the audio cue through the audio output device; generate a recording of sound using the media playback device; detect the audio cue in the recording; determine a time delay between the generation of the audio cue and the time that the audio cue was recorded in the recording; and use the calibration value to cancel audio from subsequent recordings. In certain examples, the sound system may further operate store a calibration value based on the time delay.

In certain examples, the media playback device is paired with the audio output device via a wireless communication network, such as Bluetooth.

In certain examples, prior to playing the audio cue, the sound system may operate to generate an announcement that the computing device and the audio output device has been paired, and play the announcement via the audio output device.

In certain examples, the sound system may operate to transmit time delay data to a server computing device. The time delay data may include the calibration value and information about at least one of the computing device and the audio output device.

In certain examples, the sound system may operate to transmit media content through the sound system; retrieve a reference signal and the calibration value; generate a recording of sound using the microphone; and cancel a signal of the media content from the recording using the reference signal. The recording of sound may include a user voice query. The reference signal may be delayed based on the calibration value.

In certain examples, the sound system may operate to generate a second audio cue and playing the second audio cue through the sound system; generate a recording of sound using the microphone; detect the second audio cue in the recording; determine a second time delay between the generation of the second audio cue and the time that the second audio cue was recorded in the recording; determine a second calibration value based on the second time delay; determine a difference between the calibration value and the second calibration value; determine whether the difference is within a threshold range; upon determining that the difference is within the threshold range, maintain the first calibration value; and upon determining that the difference is not within the threshold range, store the second calibration value, and use the second calibration value to cancel audio from subsequent recordings.

In certain examples, the audio cue comprises a plurality of different tones, each tone played at a different time. In certain examples, the sound system may operate to determine a time position of a peak for each tone frequency; measure a time difference between the generation of the tone frequency and the recording of the tone frequency for each tone frequency; and compute a mean average of the time differences.

Yet another aspect is a computer-readable medium having stored thereon instructions that, when executed by one or more processors cause execution of operations including at least one of the steps of: generating an announcement that a computing device and an audio output device has been paired; playing the announcement via the audio output device; generating an audio cue using the computing device; playing the audio cue through the audio output device; generating a recording of sound using a microphone; detecting the audio cue in the recording; determining a time delay between the generation of the audio cue and the time that the audio cue was recorded in the recording; storing a calibration value based on the time delay; transmitting time delay data to a server computing device, the time delay data including the calibration value and information about at least one of the computing device and the audio output device; and using the calibration value to cancel audio from subsequent recordings.

Yet another aspect is a method of audio cancellation comprising: generating an audio cue; playing the audio cue through a sound system in a sound environment, wherein the audio cue is detectable over background noise in the sound environment; generating a recording of sound using a microphone, the recording of sound including the audio cue; detecting the audio cue in the recording over the background noise in the sound environment; determining a time delay between the generation of the audio cue and the time that the audio cue was recorded in the recording by the sound system; and using the calibration value to cancel audio from subsequent recordings.

In certain examples, the audio cue may have a first root mean square (RMS) higher than a second RMS associated with the background noise.

In certain examples, the audio cue may have a strong attack.

In certain examples, the audio cue can comprise two or more frequencies.

In certain examples, the audio cue may emanate from a snare drum.

In certain examples, the background noise may be a person talking.

In certain examples, the background noise may be associated with an operation of a motor vehicle.

In certain examples, the background noise can emanate from an engine, wind noise, or traffic.

In certain examples, the audio cue can comprise a plurality of audio signals, each signal played at a different time.

In certain examples, the time that the audio cue is detected in the recording occurs may be when a RMS-to-peak ratio reaches or crosses a predetermined threshold.

In certain examples, the predetermined threshold may be 30 dBs

In certain examples, the audio cue can represent two or more signals, and wherein the method further comprises: averaging the time difference associated with the two or more signals.

Yet another aspect is a media playback system comprising: a sound system including a media playback device and an audio output device, the media playback device operable to generate a media content signal, and the audio output device configured to play media content using the media content signal; and wherein the sound system is configured to: generate an audio cue using the media playback device; transmit the audio cue to the audio output device; play the audio cue through the audio output device; generate a recording of sound using the media playback device, the recording of sound including the audio cue; detect the audio cue in the recording by determining that a RMS-to-peak ratio of the audio cue reaches a threshold; determine a time delay between the generation of the audio cue and the time that the audio cue was recorded in the recording; and use the calibration value to cancel audio from subsequent recordings.

In certain examples, the media playback device can be paired with the audio output device via a wireless communication network, such as Bluetooth®, or by a wired connection, for example, through the auxiliary input.

In certain examples, the sound system may be configured to: generate a second audio cue and play the second audio cue through the sound system; generate a recording of sound using the microphone, the recording of sound including the second audio cue; detect the second audio cue in the recording by determining that a second RMS-to-peak ratio of the second audio cue reaches or crosses the threshold; determine a second time delay between the generation of the second audio cue and the time that the second audio cue was recorded in the recording; determine a second calibration value based on the second time delay; determine a difference between the calibration value and the second calibration value; determine whether the difference is within a threshold range; upon determining that the difference is within the threshold range, maintain the first calibration value; and upon determining that the difference is not within the threshold range, store the second calibration value, and use the second calibration value to cancel audio from subsequent recordings.

In certain examples, the audio cue can comprise a plurality of different signals, each signal played at a different time, and wherein the sound system is configured to: determine a time position when a RMS-to-peak ratio reaches or crosses the threshold for each signal; measure a time difference between the generation of each signal and the recording of each signal; and compute a mean average of the time differences.

DETAILED DESCRIPTION

Figure 1:
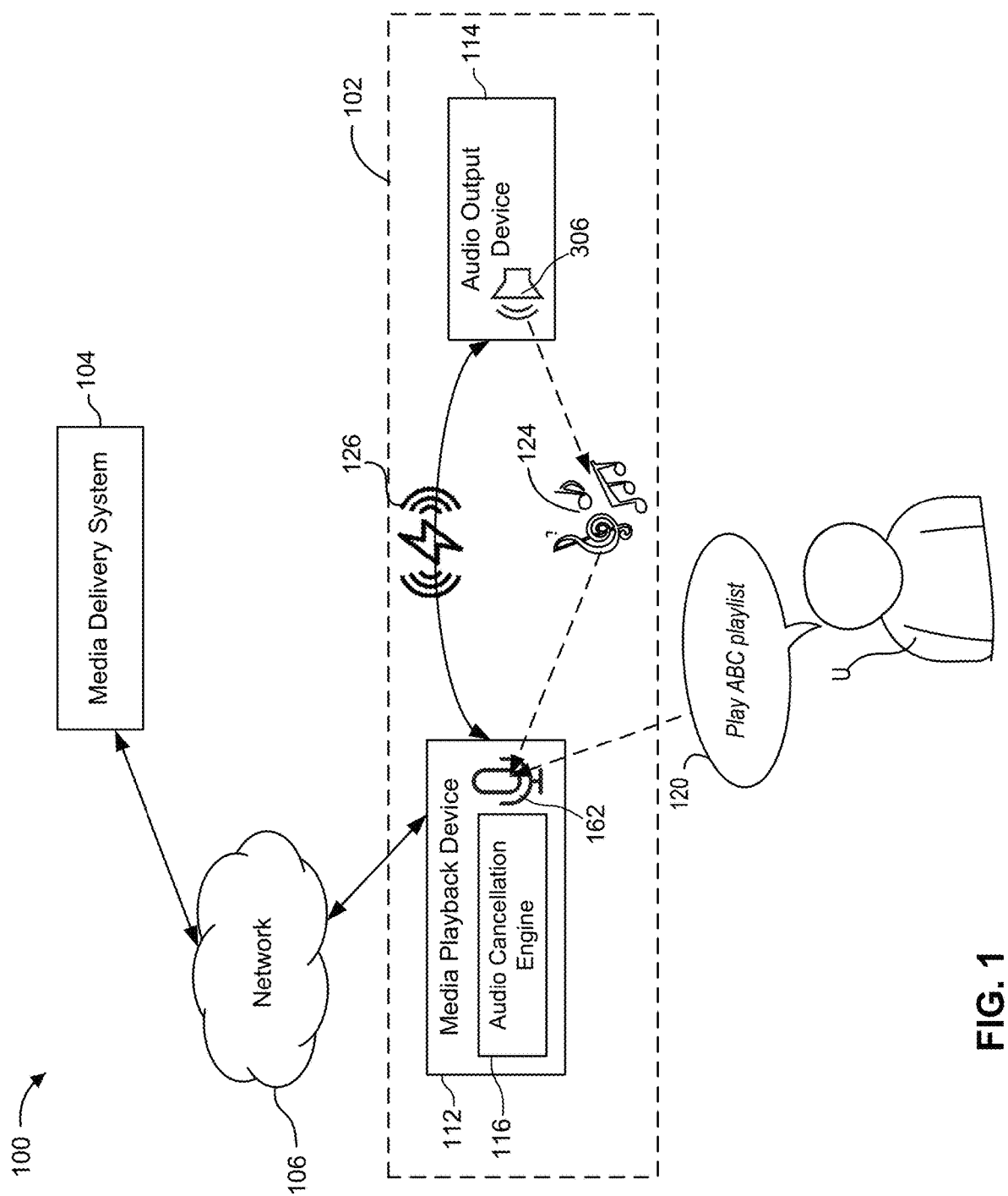
FIG. 1 illustrates an example media playback system for providing media content to a user.

Various embodiments will be described in detail with reference to the drawings, wherein like reference numerals represent like parts and assemblies throughout the several views.

In general, the present disclosure provides a solution to cancel audio for voice recognition. In particular, the present disclosure relates to a voice enabled computer system that can receive voice commands from a user. In addition, the present disclosure relates to a media playback system that provides media content to the user. The playback system may be used in an automobile, in a building, or in other environments.

In order for the voice enabled computer system to clearly record audio, such as an utterance of a user query, it is desirable to cancel out from the recording any other sound, such as audio currently being played or other ambient noise. For example, if the system is playing music while the user is providing a voice command, the audio that is received and recorded using the system should be processed to reduce or subtract the music, leaving only the user's voice command. It should be noted that the "utterance" can include a wake word and a command. A wake word is a word or phrase said by the user that provides an indication to the system that the user will follow with a command or request. For example, the term "Alexa" with Amazon Echo devices is a wake word. To detect a wake word, the system may use various techniques to eliminate other sounds, besides the wake word, to determine the user is about to enter a command. Hereinafter, the term "utterance" may refer to the wake word, the command, or both the wake word and the command.

"Near-end-echo" in an audio device happens when a Down-Link (DL) media stream is played by a speaker (built in or external) of a device, and a microphone, possibly with the same device, records or picks up the DL media stream together with an utterance (wake word and command). The DL media stream can obscure or distort the utterance when the microphone picks up the DL media stream with the utterance. The obscuring of the utterance can cause problems for a wake word (WW) engine used to detect the various commands with high reliability. As the DL media stream volume increases compared to the user's voice, the WW accuracy is reduced. The difference in volume between the target voice stream and the DL stream (plus other noise) is referred to as the Signal to Noise Ratio (SNR).

An echo canceller has the ability to suppress the DL media stream from a combined Up-Link (UL) audio when the DL signal—aka reference signal—is available to an automatic echo cancellation (AEC) algorithm. In other words, the system can store the UL signal. When receiving the DL signal, the AEC algorithm can retrieve the corresponding portion of the UL signal to cancel out the DL media stream from the recorded signal to isolate the voice of the user.

As the DL audio leaves the speaker element(s), the playback of the DL audio stream can be affected by the transfer function of the room. One important parameter in this transfer function is the delay of the reflected DL audio that reaches the microphone after one or several reflections on various surfaces. An AEC algorithm is capable of handling delays up to a certain length. For example, the AEC algorithm can use a sliding window that compares the combined UL audio signal with a window of a delayed reference signal. The size of the delay-window is typically up to 128 ms. Longer delays than that can be hard to process at recording the reference signal consumes much more memory and processing power. Further, the recording also reduces the user experience as there can be significant latency that is perceived as a slow and "laggy" user interface from when the user makes the utterance to when the command is acted upon.

If the speaker and the microphone are placed in the same device, the microphone will pick up both a direct coupling signal, with close to no latency, plus multiple reflections that the AEC algorithm can suppress. The speed of sound is 343 m/s and assuming a room with the longest reflections of 10 m, the longest acoustical echo of the DL signal is around 30 ms. But there may also be many shorter echoes caused by reflections with shorter travel time.

As soon as additional signal processing is done after the AEC, the latency can get significantly longer. When playback is done through a receiver (e.g. via S/PDIF, AUX or Bluetooth A2DP streaming) implementing a Multi band Equalizer (EQ), the latency is prolonged in the range of 5-6 ms (assuming the EQ adds 256 samples of latency @ 44.1K, which is 0.005805 seconds). The total room reflection+ additional signal processing related latency should still be acceptable for a standard EC algorithm running in the system.

The worst scenario for an AEC is if there is non-linear signal processing in an external equipment before or in the speaker. This situation can make the AEC diverge causing an even worse signal for the WW and other algorithms. Typical non-linear effects can be clipping or other distortion in a heavily loaded amplifier or an overloaded speaker element. To compensate for the latency and time delay in the signal from DL to UL, a calibration of the system may occur that is based on a measured time delay.

A challenge with typical systems relates to a delay between the time of the media content being transmitted for playback and the time of the media content being actually played. For example, the audio that is being streamed from the system is not in sync with the audio that is being emitted from a sound output device such as a speaker. Such delay of the audio being emitted may be significantly out of phase when the system that streams the audio is connected wirelessly with the sound output device, such as using a Bluetooth technology. In certain applications, the delay in Bluetooth streaming can be greater than, 4000 milliseconds; in some configurations, the delay may be 100 to 200 milliseconds and, in some configurations, may be a second or more. Further, variations in different sound output devices and media streaming systems can cause variations in how much delay is present. Such huge delay introduces a challenge to accurately synchronize between a reference signal for audio cancellation and the sound signal detected by a microphone of the system.

In other configurations, the system may be wired and still experience a delay. The audio system may use one of several interfaces, for example, AES3, Sony/Philips Digital Interface (S/PDIF), etc. The interfaces may be connected physically with one of several types of connectors and wires, for example, D-subminiature (DB25) connectors, DIN connectors and mini-DIN connectors, Euroblock "European-style terminal block" or "Phoenix connectors", screw terminal connectors, RCA connectors, XLR connectors, etc.

Typical sound cancellation technologies utilize a predetermined fixed delay period, which can be set up at manufacturing stage. However, such a fixed delay value is neither adjustable at runtime nor adaptive to different playback systems.

An audio cancellation solution in accordance with the present disclosure solves the problems discussed above by utilizing a calibration step to detect and measure the delay within a specific audio and wireless (e.g., Bluetooth) or wired systems. The calibration step includes generating and playing an audio cue, recording the audio cue, and calculating a delay between the generation and the recording of the cue. The measured delay can then be used to cancel particular audios from future recordings. In certain examples, the audio cancellation solution can include steps of paring the audio output device with a wireless media playback device (e.g., a Bluetooth device), generating an announcement to the user that the audio output device has been paired, and playing an audio cue immediately after the announcement to initiate the calibration process. In certain examples, this process may function to make the calibration process not recognizable by the user and instead make it sound that the audio cue is merely a tone that confirms that pairing has been completely successfully. In certain examples, the calibration process can be repeated periodically, and if the calibration value is not determined to fall within a threshold range, the calibration value can be updated.

FIG. 1 illustrates an example media playback system 100 for providing media content to a user U. The system 100 includes a sound system 102, a media delivery system 104, and a data communication network 106. The sound system 102 includes a media playback device 112 and an audio output device 114. The media playback device 112 includes an audio cancellation engine 116 and a sound detection device 162. The audio output device 114 includes a speaker 306 configured to generate media output 124. An example user query 120 and a wireless communication network 126 are also shown.

The sound system 102 is configured to provide media content to the user U. In some embodiments, the sound system 102 operates to receive media content from the media delivery system 104, and play the media content and generate the media output 124.

In some embodiments, the sound system 102 includes the media playback device 112 and the audio output device 114.

The media playback device 112 operates to provide media content to a user U. As described herein, the media playback device 112 operates to receive the user query 120 and provide the media output 124 to the user U according to the user query 120. As described herein, the user query 120 can include a search request from the user U to identify media content. In some embodiments, the user query 120 can include a wake word preceding the search request. A wake word is a word or phrase that triggers an interface of a device (e.g., the media playback device 112) to listen for user commands or queries. The user query 120 can be also referred to herein as a search query, a search request, or the like. In some embodiments, the user query 120 can be a text that is typed using the media playback device 112 or another computing device. In other embodiments, the user query 120 can be a voice request received through a sound detection device (e.g., a microphone).

In some embodiments, the media playback device 112 operates to communicate with a system external to the media playback device 112, such as the media delivery system 104. The media playback device 112 can interact with the media delivery system 104 to process the user query 120 and identify media content in response to the user query 120. In some embodiments, the media playback device 112 operates to receive the media content that is identified and provided (e.g., streamed, transmitted, etc.) by the media delivery system 104. In some embodiments, the media playback device 112 operates to play the media content and generate the media output 124 using a media output device (e.g., a speaker) therein. In other embodiments, the media playback device 112 operates to transmit the media content to another device for playback, such as a separate audio output device 114 as illustrated in FIG. 1. An example of the media playback device 112 is illustrated and described in more detail herein, such as with reference to FIG. 2.

In some embodiments, the media playback device 112 is a mobile device, such as a handheld or portable entertainment device, smartphone, tablet, watch, wearable device, or any other type of computing device capable of playing media content. In other embodiments, the media playback device 112 is a laptop computer, desktop computer, television, gaming console, set-top box, network appliance, blue-ray or DVD player, media player, stereo, or radio.

The audio output device 114 is configured to generate audio to the user U. In some embodiments, the audio output device 114 operates to receive a signal from a computing device, such as the media playback device 112, and generate audio, such as media content, using the signal. The audio output device 114 can be of various types, such as an external speaker, a vehicle entertainment system, a home entertainment system, and other media playback devices. An example of the audio output device 114 is illustrated and described in more detail herein, such as with reference to FIG. 3.

In some embodiments, the audio output device 114 is incorporated in the media playback device 112 and integrally made with the media playback device 112. In other embodiments, the media playback device 112 and the audio output device 114 are separately made and connected each other in a wired configuration, such as an auxiliary (AUX) output interface or a USB interface. In other embodiments, as illustrated in FIG. 1, the media playback device 112 is wirelessly connected with the audio output device 114, such as using Bluetooth, FM transmission, and any other wireless communication interfaces.

The sound system 102 can be implemented in various applications. By way of example, the sound system 102 can be implemented in a vehicle audio system where the audio output device 114 can be a vehicle audio system and the media playback device 112 is paired with the vehicle audio system via the wireless communication network 126. In other examples, the sound system 102 can be implemented in a home or office environment where the audio output device 114 is one or more speaker devices and the media playback device 112 is paired with the speaker devices via the wireless communication network 126. Other examples are also possible.

The media delivery system 104 operates to provide media content to one or more media playback devices, such as the sound system 102, the media playback device 112, and/or the audio output device 114, via the network 106. An example of the media delivery system 104 is illustrated and described in further detail herein, such as with reference to FIG. 2.

The network 106 is a data communication network that facilitates data communication between the sound system 102 (e.g., the media playback device 112 and/or the audio output device 114) and the media delivery system 104. The network 106 typically includes a set of computing devices and communication links between the computing devices. The computing devices in the network 106 use the links to enable communication among the computing devices in the network. The network 106 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of communication links. For example, the network 106 can include wired and/or wireless links, including cellular, Bluetooth®, Wi-Fi, ultra-wideband (UWB), 802.11, ZigBee, near field communication (NFC), an ultrasonic data transmission, and other types of wireless links. Furthermore, in various embodiments, the network 106 is implemented at various scales. For example, the network 106 can be implemented as one or more vehicle area networks, local area networks (LANs), metropolitan area networks, subnets, wide area networks (WAN) (such as the Internet), or can be implemented at another scale. Further, in some embodiments, the network 106 includes multiple networks, which may be of the same type or of multiple different types.

Referring still to FIG. 1, in some embodiments, the media playback device 112 includes the sound detection device 162, such as a microphone. As described herein, the sound detection device 162 operates to record audio around the media playback device 112, such as a user's voice (e.g., the user query 120), the media output 124, and other ambient sounds (e.g., ambient noise). An example of the sound detection device 162 is illustrated and described in further detail herein, such as with reference to FIG. 2.

Referring still to FIG. 1, the media playback device 112 further includes the audio cancellation engine 116. The audio cancellation engine 116 operates audio cancellation as described herein.

Figure 2:
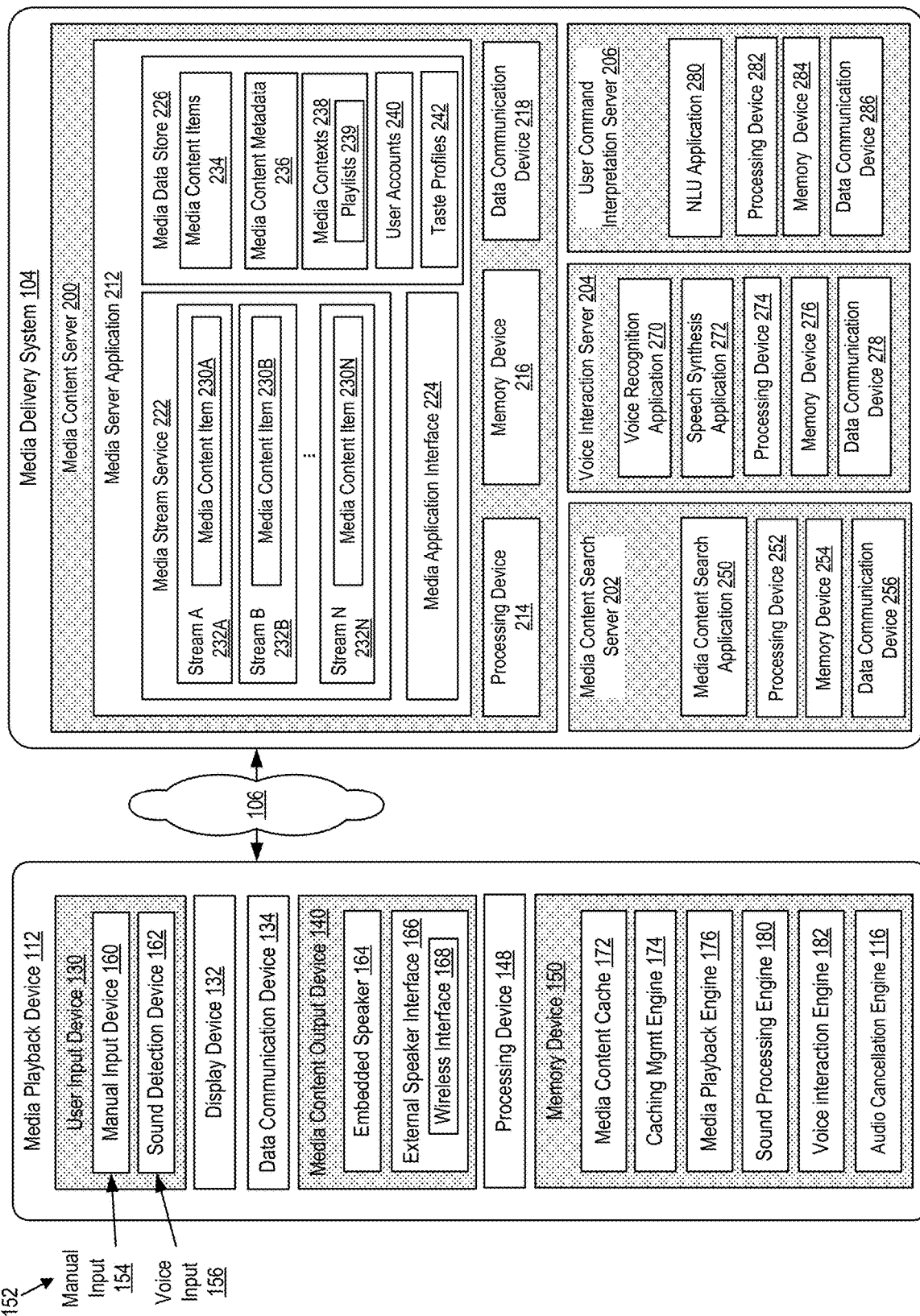
FIG. 2 is a block diagram of an example media playback device of the system shown in FIG. 1.

FIG. 2 is a block diagram of an example embodiment of the media playback device 112 of the system 100 shown in FIG. 1. In this example, the media playback device 112 includes a user input device 130, a display device 132, a wireless data communication device 134, a media content output device 140, a processing device 148, and a memory device 150.

The media playback device 112 operates to play media content. For example, the media playback device 112 is configured to play media content that is provided (e.g., streamed or transmitted) by a system external to the media playback device 112, such as the media delivery system 104, another system, or a peer device. In other examples, the media playback device 112 operates to play media content stored locally on the media playback device 112. In yet other examples, the media playback device 112 operates to play media content that is stored locally as well as media content provided by other systems.

In some embodiments, the media playback device 112 is a handheld or portable entertainment device, smartphone, tablet, watch, wearable device, or any other type of computing device capable of playing media content. In other embodiments, the media playback device 112 is a laptop computer, desktop computer, television, gaming console, set-top box, network appliance, blue-ray or DVD player, media player, stereo, or radio.

The user input device 130 operates to receive a user input 152 from a user U for controlling the media playback device 112. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the media playback device 112. In some embodiments, the manual input device 160 includes one or more buttons, keys, touch levers, switches, and/or other mechanical input devices for receiving the manual input 154. For example, the manual input device 160 includes a text entry interface, such as a mechanical keyboard, a virtual keyboard, or a handwriting input device, which is configured to receive a text input, such as a text version of the user query 120. In addition, in some embodiments, the manual input 154 is received for managing various pieces of information transmitted via the media playback device 112 and/or controlling other functions or aspects associated with the media playback device 112.

The sound detection device 162 operates to detect and record sounds from proximate the media playback device 112. For example, the sound detection device 162 can detect sounds including the voice input 156. In some embodiments, the sound detection device 162 includes one or more acoustic sensors configured to detect sounds proximate the media playback device 112. For example, acoustic sensors of the sound detection device 162 include one or more microphones. Various types of microphones can be used for the sound detection device 162 of the media playback device 112.

In some embodiments, the voice input 156 is a user's voice (also referred to herein as an utterance) for controlling playback of media content via the media playback device 112. For example, the voice input 156 includes a voice version of the user query 120 received from the sound detection device 162 of the media playback device 112. In addition, the voice input 156 is a user's voice for managing various data transmitted via the media playback device 112 and/or controlling other functions or aspects associated with the media playback device 112.

In some embodiments, the sounds detected by the sound detection device 162 can be processed by the sound processing engine 180 of the media playback device 112 as described below.

Referring still to FIG. 2, the display device 132 operates to display information to the user U. Examples of such information include media content playback information, notifications, and other information. In some embodiments, the display screen 132 is configured as a touch sensitive display and includes the manual input device 160 of the user input device 130 for receiving the manual input 154 from a selector (e.g., a finger, stylus etc.) controlled by the user U. In some embodiments, therefore, the display screen 132 operates as both a display device and a user input device. The touch sensitive display screen 132 operates to detect inputs based on one or both of touches and near-touches. In some embodiments, the display screen 132 displays a graphical user interface for interacting with the media playback device 112. Other embodiments of the display screen 132 do not include a touch sensitive display screen. Some embodiments include a display device and one or more separate user interface devices. Further, some embodiments do not include a display device.

The data communication device 134 operates to enable the media playback device 112 to communicate with one or more computing devices over one or more networks, such as the network 106. For example, the data communication device 134 is configured to communicate with the media delivery system 104 and receive media content from the media delivery system 104 at least partially via the network 106. The data communication device 134 can be a network interface of various types which connects the media playback device 112 to the network 106. Examples of the data communication device 134 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 140 operates to output media content. In some embodiments, the media content output device 140 generates the media output 122 for the user U. In some embodiments, the media content output device 140 includes one or more embedded speakers 164 which are incorporated in the media playback device 112.

Alternatively or in addition, some embodiments of the media playback device 112 include an external speaker interface 166 as an alternative output of media content. The external speaker interface 166 is configured to connect the media playback device 112 to another system, such as the audio output device 114, which has one or more speakers, such as headphones, a portal speaker, and a vehicle entertainment system, so that the media output 122 is generated via the speakers of the other system external to the media playback device 112.

In some embodiments, the external speaker interface 166 can be a wired configuration, such as an audio output jack, a USB port, and other wireless signal transmission technology. In other embodiments, the external speaker interface 166 includes a wireless interface 168 configured for a wireless signal transmission. Examples of such wireless interface 168 for the external speaker interface 166 include a wireless interface 168, a Wi-Fi transmitter, a near field communication (NFC), an ultrasonic data transmission, and other types of wireless links. Other embodiments are possible as well. For example, the external speaker interface 166 is configured to transmit a signal that can be used to reproduce an audio signal by a connected or paired device such as headphones or a speaker.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the media playback device 112. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 112. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media playback engine 176, a sound processing engine 180, a voice interaction engine 182, and the audio cancellation engine 116.

Some embodiments of the memory device 150 include the media content cache 172. The media content cache 172 stores media content items, such as media content items that have been received from the media delivery system 104. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 104, the caching management engine 174 operates to cache at least a portion of the media content into the media content cache 172. In other embodiments, the caching management engine 174 operates to cache at least a portion of media content into the media content cache 172 while online so that the cached media content is retrieved for playback while the media playback device 112 is offline.

The media playback engine 176 operates to play media content to the user U. As described herein, the media playback engine 176 is configured to communicate with the media delivery system 104 to receive one or more media content items (e.g., through the media stream 232, such as 232A, 232B, and 232C). In other embodiments, the media playback engine 176 is configured to play media content that is locally stored in the media playback device 112.

In some embodiments, the media playback engine 176 operates to retrieve one or more media content items that are either locally stored in the media playback device 112 or remotely stored in the media delivery system 104. In some embodiments, the media playback engine 176 is configured to send a request to the media delivery system 104 for media content items and receive information about such media content items for playback.

The sound processing engine 180 is configured to receive sound signals obtained from the sound detection device 162 and process the sound signals to identify different sources of the sounds received via the sound detection device 162. In some embodiments, the sound processing engine 180 operates to filter the user's voice input 156 (e.g., a voice request of the user query 120) from noises included in the detected sounds. In some embodiments, the sound processing engine 180 can use the audio cancellation solution as described herein. In other embodiments, other various noise cancellation technologies, such as active noise control or canceling technologies or passive noise control or cancelling technologies, can be used to filter the voice input from ambient noise. In examples, the sound processing engine 180 filters out omni-directional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device. (e.g., to reduce the need of the user to shout over playing music). In examples, the sound processing engine 180 performs echo cancellation.

In other embodiments, the sound processing engine 180 operates to process the received sound signals to identify the sources of particular sounds of the sound signals, such as a user's voice query, media content playback, people's conversation, or other ambient sounds, such as vehicle engine noise in a vehicle cabin.

In some embodiments, the sound processing engine 180 at least partially operates to analyze a recording of sounds captured using the sound detection device 162, using speech recognition technology to identify words spoken by the user. In addition or alternatively, other computing devices, such as the media delivery system 104 (e.g., a voice interaction server 204 thereof) can cooperate with the media playback device 112 for such analysis. The words may be recognized as commands from the user that alter the playback of media content and/or other functions or aspects of the media playback device 112. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the media playback device 112 such as volume, dominant frequency or frequencies, etc. These sound properties may be used to make inferences about the environment proximate to the media playback device 112.

The voice interaction engine 182 operates to cooperate with the media delivery system 104 (e.g., a voice interaction server 204 thereof) to identify a command (e.g., a user intent) that is conveyed by the voice input 156. In some embodiments, the voice interaction engine 182 transmits the user's voice input 156 that is detected by the sound processing engine 180 to the media delivery system 104 so that the media delivery system 104 operates to determine a command intended by the voice input 156. In other embodiments, at least some of the determination process of the command can be performed locally by the voice interaction engine 182. Where the voice input 156 includes a wake word, the wake word can also be processed similarly.

In addition, some embodiments of the voice interaction engine 182 can operate to cooperate with the media delivery system 104 (e.g., the voice interaction server 204 thereof) to provide a voice assistant that performs various voice-based interactions with the user, such as voice feedbacks, voice notifications, voice recommendations, and other voice-related interactions and services.

As described herein, the audio cancellation engine 116 operates to perform audio cancellation described herein. For example, example operations that can be performed at least partially by the audio cancellation engine 116 are illustrated herein, such as with reference to FIG. 4.

Referring still to FIG. 2, the media delivery system 104 includes a media content server 200, a media content search server 202, a voice interaction server 204, and a user command interpretation server 206.

The media delivery system 104 comprises one or more computing devices and provides media content to the media playback device 112 and, in some embodiments, other media playback devices as well. In addition, the media delivery system 104 interacts with the media playback device 112 to provide the media playback device 112 with various functionalities.

In at least some embodiments, the media content server 200, the media content search server 202, the voice interaction server 204, and the user command interpretation server 206 are provided by separate computing devices. In other embodiments, the media content server 200, the media content search server 202, the voice interaction server 204, and the user command interpretation server 206 are provided by the same computing device(s). Further, in some embodiments, at least one of the media content server 200, the media content search server 202, the voice interaction server 204, and the user command interpretation server 206 is provided by multiple computing devices. For example, the media content server 200, the media content search server 202, the voice interaction server 204, and the user command interpretation server 206 may be provided by multiple redundant servers located in multiple geographic locations.

Although FIG. 2 shows a single media content server 200, a single media content search server 202, a single voice interaction server 204, and a single user command interpretation server 206, some embodiments include multiple media content servers, media content search servers, voice interaction servers, and user command interpretation servers. In these embodiments, each of the multiple media content servers, media content search servers, voice interaction servers, and user command interpretation servers may be identical or similar to the media content server 200, the media content search server 202, the voice interaction server 204, and the user command interpretation server 206, respectively, as described herein, and may provide similar functionality with, for example, greater capacity and redundancy and/or services from multiple geographic locations. Alternatively, in these embodiments, some of the multiple media content servers, the media content search servers, the voice interaction servers, and/or the user command interpretation servers may perform specialized functions to provide specialized services. Various combinations thereof are possible as well.

The media content server 200 transmits stream media to media playback devices such as the media playback device 112. In some embodiments, the media content server 200 includes a media server application 212, a processing device 214, a memory device 216, and a data communication device 218. The processing device 214 and the memory device 216 may be similar to the processing device 148 and the memory device 150, respectively, which have each been previously described. Therefore, the description of the processing device 214 and the memory device 216 are omitted for brevity purposes.

The data communication device 218 operates to communicate with other computing devices over one or more networks, such as the network 106. Examples of the data communication device include one or more wired network interfaces and wireless network interfaces. Examples of such wireless network interfaces of the data communication device 218 include wireless wide area network (WWAN) interfaces (including cellular networks) and wireless local area network (WLANs) interfaces. In other examples, other types of wireless interfaces can be used for the data communication device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more media streams 232A, 232B, and 232N (collectively 232).

The media application interface 224 can receive requests or other communication from media playback devices or other systems, such as the media playback device 112, to retrieve media content items from the media content server 200. For example, in FIG. 2, the media application interface 224 receives communication from the media playback device 112 to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In addition or alternatively, the media content metadata 236 provides various information associated with the media contexts 238. In some embodiments, the media content metadata 236 includes one or more of title, artist name, album name, length, genre, mood, era, etc.

The media content metadata 236 operates to provide various pieces of information (also referred to herein as attribute(s)) associated with the media content items 234 and/or the media contexts 238. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML, or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 2, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device, such as the media playback device 112. The media playback device then operates to communicate with the media delivery system 104 so that the media delivery system 104 retrieves the media content items identified by the playlist 239 and transmits data for the media content items to the media playback device for playback.

In some embodiments, the playlist 239 includes one or more playlist descriptions. The playlist descriptions include information associated with the playlist 239. The playlist descriptions can include a playlist title. In some embodiments, the playlist title can be provided by a user using the media playback device 112. In other embodiments, the playlist title can be provided by a media content provider (or a media-streaming service provider). In yet other embodiments, the playlist title can be automatically generated.

Other examples of playlist descriptions include a descriptive text. The descriptive text can be provided by the user and/or the media content provider, which is to represent the corresponding playlist 239. In other embodiments, the descriptive text of the playlist description can be obtained from one or more other sources. Such other sources can include expert opinion (e.g., music reviews or classification of music into genres), user opinion (e.g., reviews through websites, chatrooms, blogs, surveys, and the like), statistics (e.g., sales data), shared collections, lists of favorite playlists, and any text information that may be used to describe, rank, or interpret the playlist or music associated with the playlist. In some embodiments, the playlist descriptions can also be generated by a community of listeners and automatically retrieved from Internet sites, chat rooms, blogs, and the like.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist. Each term of the description vector indicates the probability that a corresponding word or phrase would be used to describe the associated track, album or artist.

In some embodiments, the playlist 239 includes a list of media content item identifications (IDs). The list of media content item identifications includes one or more media content item identifications that refer to respective media content items 234. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 239 may include user-created playlists. For example, a user of a media streaming service provided using the media delivery system 104 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 239 are created by a media streaming service provider. For example, such provider-created playlists can be automatically created by the media delivery system 104. In some embodiments, a provider-created playlist can be customized to a particular user or a particular group of users. By way of example, a playlist for a particular user can be automatically created by the media delivery system 104 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 240 are used to identify users of a media streaming service provided by the media delivery system 104. In some embodiments, a user account 240 allows a user to authenticate to the media delivery system 104 and enable the user to access resources (e.g., media content items, playlists, etc.) provided by the media delivery system 104. In some embodiments, the user can use different devices to log into the user account and access data associated with the user account in the media delivery system 104. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 104 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Referring still to FIG. 2, the media content search server 202 operates to perform media content search in response to a media content search request, such as the user query 120 (FIG. 1). In some embodiments, the media content search server 202 includes a media content search application 250, a processing device 252, a memory device 254, and a data communication device 256. The processing device 252, the memory device 254, and the data communication device 256 may be similar to the processing device 214, the memory device 216, and the data communication device 218, respectively, which have each been previously described.

In some embodiments, the media content search application 250 operates to interact with the media playback device 112 and provide selection of one or more media content items based on the user query 120. The media content search application 250 can interact with other servers, such as the media content server 200, the voice interaction server 204, and the user command interpretation server 206, to perform media content search.

Referring still to FIG. 2, the voice interaction server 204 operates to provide various voice-related functionalities to the media playback device 112. In some embodiments, the voice interaction server 204 includes a voice recognition application 270, a speech synthesis application 272, a processing device 274, a memory device 276, and a data communication device 278. The processing device 274, the memory device 276, and the data communication device 278 may be similar to the processing device 214, the memory device 216, and the data communication device 218, respectively, which have each been previously described.

In some embodiments, the voice recognition application 270 and the speech synthesis application 272, either individually or in combination, operate to interact with the media playback device 112 and enable the media playback device 112 to perform various voice-related functions, such as voice media content search, voice feedback, voice notifications, etc.

In some embodiments, the voice recognition application 270 is configured to perform speech-to-text (STT) conversion, such as receiving a recording of voice command (e.g., an utterance) and converting the utterance to a text format.

In some embodiments, the speech synthesis application 272 is configured to perform text-to-speech (TTS) conversion, so that a language text is converted into speech. Then, the voice interaction server 204 can transmit an audio data or file for the speech to the media playback device 112 so that the media playback device 112 generates a voice assistance to the user using the transmitted audio data or file.

Referring still to FIG. 2, the user command interpretation server 206 operates to analyze the user command (e.g., the utterance) to determine appropriate actions to take according to the user command. In some embodiments, the user command interpretation server 206 analyzes a text version of a user command (e.g., a text version of the utterance). In other embodiments, a recording of the user command can be used for such analysis without converting into a text format.

In some embodiments, the user command interpretation server 206 includes a natural language understanding (NLU) application 280, a processing device 282, a memory device 284, and a data communication device 286. The processing device 282, the memory device 284, and the data communication device 286 may be similar to the processing device 214, the memory device 216, and the data communication device 218, respectively, which have each been previously described.

In some embodiments, the NLU application 280 operates to analyze the text format of the utterance to determine functions to perform based on the utterance. The NLU application 280 can use a natural language understanding algorithm that involves modeling human reading comprehension, such as parsing and translating an input according to natural language principles.

Figure 3:
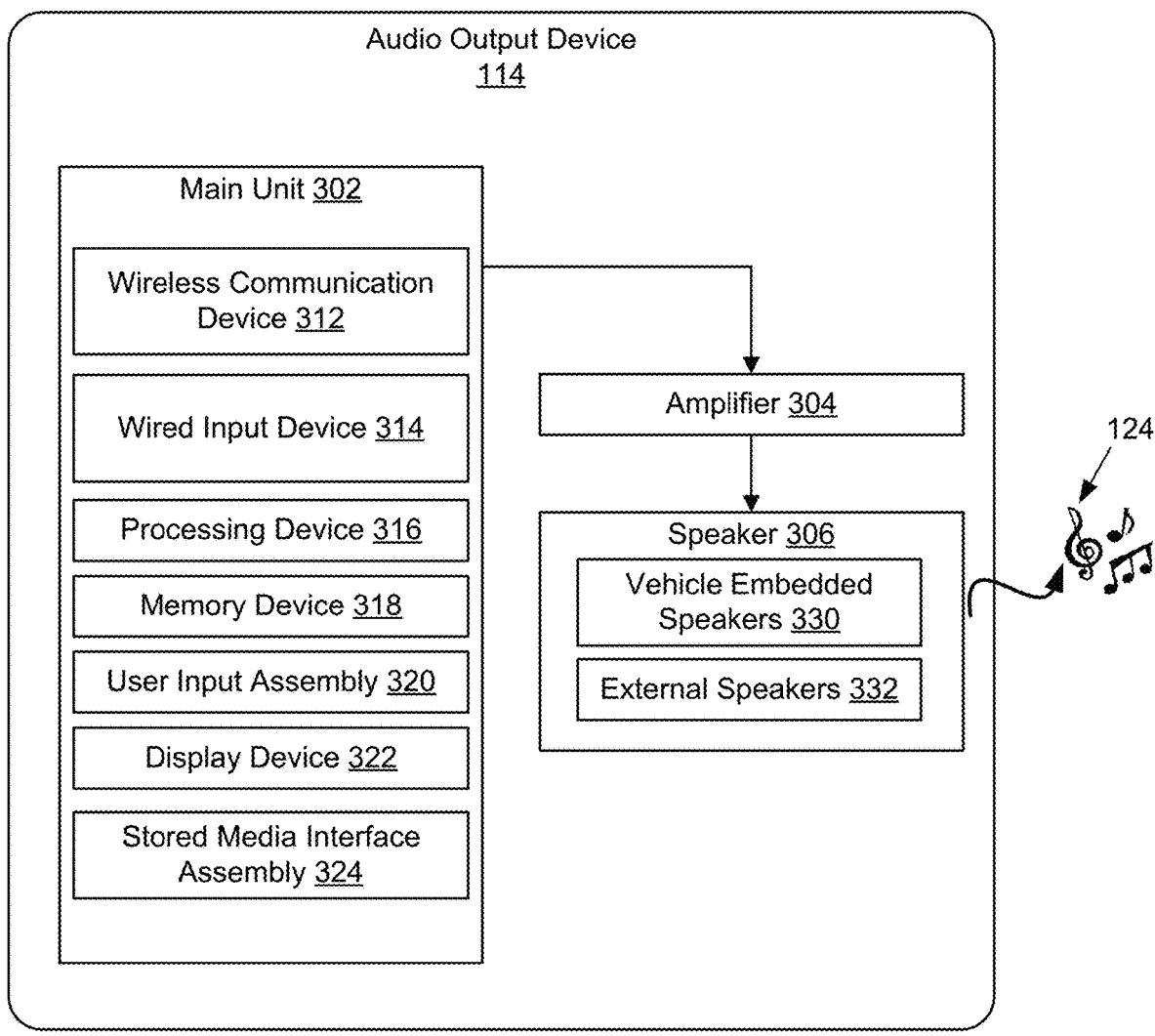
FIG. 3 is a block diagram of an example audio output device of the system shown in FIG. 1.

FIG. 3 is a block diagram of an example embodiment of the audio output device 114. In this example, the audio output device 114 includes a main unit 302, an amplifier 304, and a speaker 306.

The main unit 302 is configured to receive a user input and generate media content from various sources. In this example, the main unit 302 includes a wireless communication device 312, a wired input device 314, a processing device 316, a memory device 318, a user input assembly 320, a display device 322, and a stored media interface assembly 324.

The wireless communication device 312 operates to communicate with other devices (e.g., the media playback device 112) using wireless data signals, and receive media content signals from such other devices. The received signals can then be used to generate media output by the audio output device 114. The wireless communication device 312 can include one or more of a BLUETOOTH transceiver and a Wi-Fi transceiver. The wireless data signal may comprise a media content signal such as an audio or video signal. In some embodiments, the wireless communication device 312 is used to enable the audio output device 114 to wirelessly communicate with the media playback device 112 and receive a signal from the media playback device 112 via the wireless communication network 126 (FIG. 2).

The wired input device 314 provides an interface configured to receive a cable for providing media content and/or commands. The wired input device 314 includes an input connector 340 configured to receive a plug extending from a media playback device for transmitting a signal for media content. In some embodiments, the wired input device 314 can include an auxiliary input jack (AUX) for receiving a plug from a media playback device that transmits analog audio signals. The wired input device 314 can also include different or multiple input jacks for receiving plugs from media playback devices that transmit other types of analog or digital signals (e.g., USB, HDMI, Composite Video, YPbPr, and DVI). In some embodiments, the wired input device 314 is also used to receive instructions from other devices.

The processing device 316 operates to control various devices, components, and elements of the audio output device 114. The processing device 316 can be configured similar to the processing device 148 (FIG. 2) and, therefore, the description of the processing device 316 is omitted for brevity purposes.

In some embodiments, the processing device 316 operates to process the media content signal received from the media playback device 112 and convert the signal to a format readable by the audio output device 114 for playback.

The memory device 318 is configured to store data and instructions that are usable to control various devices, components, and elements of the audio output device 114. The memory device 318 can be configured similar to the memory device 150 (FIG. 2) and, therefore, the description of the memory device 318 is omitted for brevity purposes.

The user input assembly 320 includes one or more input devices for receiving user input from users for controlling the audio output device 114. In some embodiments, the user input assembly 320 includes multiple knobs, buttons, and other types of input controls for adjusting volume, selecting sources and content, and adjusting various output parameters. In some embodiments, the various input devices are disposed on or near a front surface of the main unit 302. Where implemented in a vehicle, the various input devices can also be disposed on the steering wheel of the vehicle or elsewhere. Additionally or alternatively, the user input assembly 320 can include one or more touch sensitive surfaces, which can be incorporated in the display device 322.

The display device 322 displays information. In some embodiments, the display device 322 includes a liquid crystal display (LCD) panel for displaying textual information about content and/or settings of the audio output device 114. The display device 322 can also include other types of display panels such as a light emitting diode (LED) panel. In some embodiments, the display device 322 can also display image or video content.

The stored media interface assembly 324 reads media content stored on a physical medium. In some embodiments, the stored media interface assembly 324 comprises one or more devices for reading media content from a physical medium such as a USB drive, flash drive, compact disc, or cassette tape.

The amplifier 304 operates to amplify a signal received from the main unit 302 and transmits the amplified signal to the speaker 306. In this manner, the media output 124 can be played back at a greater volume. The amplifier 304 may include a power source to power the amplification.

The speaker 306 operates to produce an audio output (e.g., the media output 124) based on an electronic signal. The speaker 306 can include one or more embedded speakers 330 incorporated in the main unit 302 of the audio output device 114. In some embodiments, separate signals are received for at least some of the speakers (e.g., to provide stereo or surround sound).

In addition or alternatively, the speaker 306 can include one or more external speakers 332 which are arranged outside or separately from the main unit 302 of the audio output device 114. Where implemented in a vehicle, users may bring one or more external speakers 332 into different locations (e.g., within a vehicle cabin) and connect the external speakers 332 to the main unit 302 using a wired interface or a wireless interface. In some embodiments, the external speakers 332 can be connected to the main unit 302 using BLUETOOTH. Other wireless protocols can be used to connect the external speakers 332 to the main unit 302. In other embodiments, a wired connection (e.g., a cable) can be used to connect the external speakers 332 to the main unit 302. Examples of the wired connection include an analog or digital audio cable connection and a universal serial bus (USB) cable connection. The external speaker 332 can also include a mechanical apparatus for attachment to a structure of the vehicle.

Figure 4:
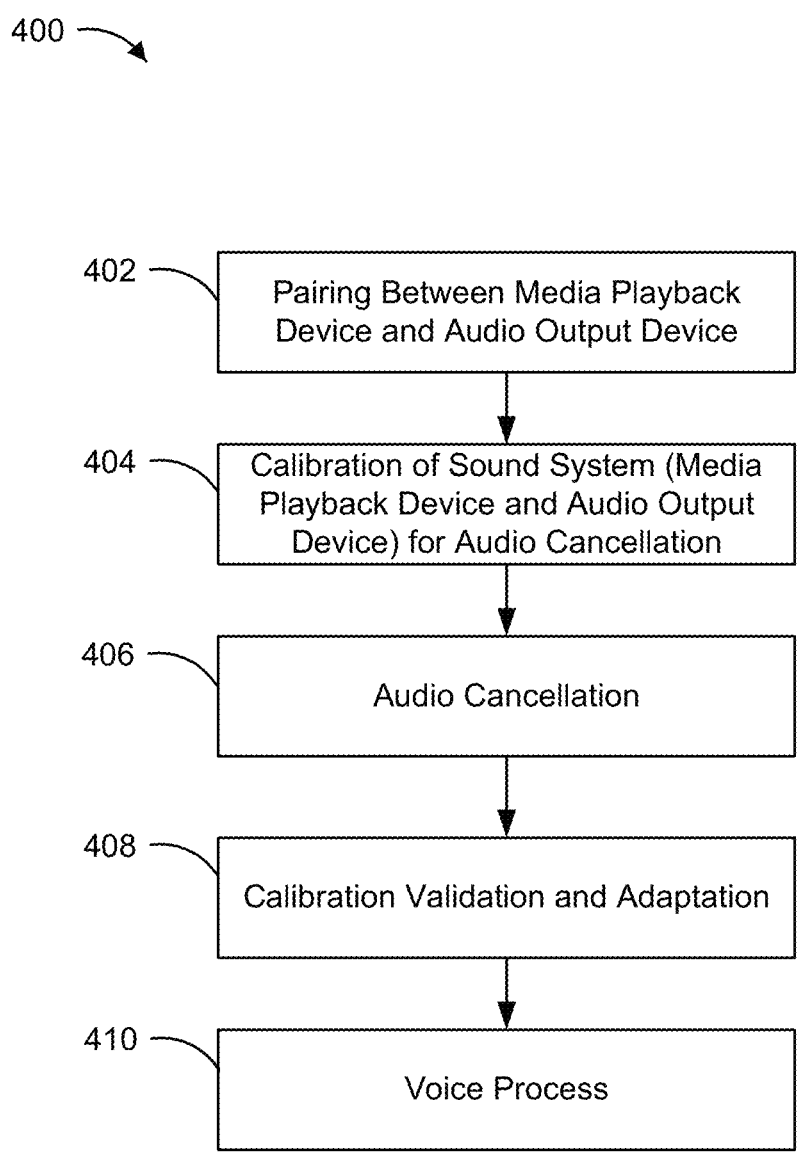
FIG. 4 is a flowchart of an example method for canceling audio in the media playback system.

FIG. 4 is a flowchart of an example method 400 for canceling audio in the media playback system 100. In some embodiments, the method 400 is used to perform audio cancellation when the media playback device 112 is wirelessly connected to the audio output device 114. It is understood however that the method 400 can also be used to perform audio cancellation in other applications, such as when the media playback device 112 is wired to the audio output device 114, when the audio output device 114 is integrated with the media playback device 112, or when the media playback device 112 performs both generation and recording of sound without the audio output device 114.

The method 400 can begin at operation 402 in which the media playback device 112 is paired with the audio output device 114. In some embodiments, the media playback device 112 is paired with audio output device 114 using a BLUETOOTH interface. In other embodiments, other wireless technologies can be used to connect the media playback device 112 with the audio output device 114.

In some embodiments, when the media playback device 112 is paired with the audio output device 114, the media playback device 112 generates a notification to inform the user U that the pairing process has been completed. The notification can be of various formats. In some embodiments, the notification can be an audio statement (e.g., "Your device is now paired.") or a sound which is provided via the media playback device 112 and/or the audio output device 114. In some embodiments, the audio cue that is described herein can replace the notification and be used to inform that the pairing has been completed while being used for the calibration process. In these embodiments, the calibration process can be hidden from the user, and the user will not recognize the fact that the calibration process is happening and will only think that the pairing process has been performed and completed.

In other embodiments, the notification can be a visual object, such as an icon, symbol, statement, etc., which can be displayed on the media playback device 112 and/or the audio output device 114.

At operation 404, the sound system 102, which includes the media playback device 112 and the audio output device 114, is calibrated for audio cancellation. As described herein, when a wired or wireless connection is implemented in the sound system 102, such a connection introduces a significant time delay between audio being generated and the audio being reproduced. The time delay makes it difficult to filter a desired sound (e.g., a user's voice command) from an audio recording without using a large amount of memory and/or CPU computation.

The calibration process at the operation 404 allows accurately determining a delay between the time of audio being transmitted from the media playback device 112 and the time of the audio being generated at the audio output device 114. The determined delay can be used to cancel undesired audio from the sound recorded at the media playback device 112 so that a user's voice query can be effectively and clearly identified from the sound recording, without requiring significant computing and memory resources. Determining the delay allows for the "filter" to be separated into two components. First, a large bulk delay can eliminate the unwanted part of the signal in the time periods around when the user's voice is received. The bulk delay filter is generally easier to implement (and less costly in computational resources). Further, the large bulk delay filter can be computed by a processor that may have larger memory capacity (to store the larger portion of the signal) but fewer available processing cycles available. The second component is a smaller unknown filter that can filter the unwanted sounds during the user's voice command. The smaller unknown filter is harder to implement and thus more costly in computation resources. The smaller unknown filter may be implemented on a digital signal processor (DSP) where the system has less memory but more computing power. In other embodiments, the calibration can be performed to determine other delays in the sound system 102. An example of the calibration operation is illustrated and described in more detail herein, such as with reference to FIGS. 5-7.

At operation 406, audio cancelation is performed for the sound system 102 while the sound system 102 is in operation. The audio cancellation is operated to cancel undesired audio from the sound recorded at the media playback device 112 and identify desired audio from the sound recording. By way of example, the user can provide a voice query at the media playback device 112 while media content is being played at the audio output device 114. The sound recorded at the media playback device 112 can include a mixed signal of the media content and the user's voice query. The audio cancelation process can cancel the signal of the media content from the sound recording and thus identify the voice query clearly. An example of the audio cancellation operation is illustrated and described in more detail herein, such as with reference to FIG. 8.

At operation 408, the calibration performed at the operation 404 is validated and adapted while the sound system 102 is in operation. In some embodiments, the time delay detected at the calibration operation is validated in the operation of the sound system 102. In addition, the time delay can be adjusted to be adapted to the real-time operation of the sound system 102. For example, the time delay can be verified to determine if it is within a tolerable range. If the time delay determined at the operation 404 is not within such a range, the time delay is adjusted for improved audio cancellation. An example of the validation and adaptation operation is illustrated and described in more detail herein, such as with reference to FIG. 9.

At operation 410, when the user query is identified from the sound recording, a voice process is performed based on the identified user query. An example of the voice process is illustrated and described in more detail herein, such as with reference to FIG. 10.

Figure 5:
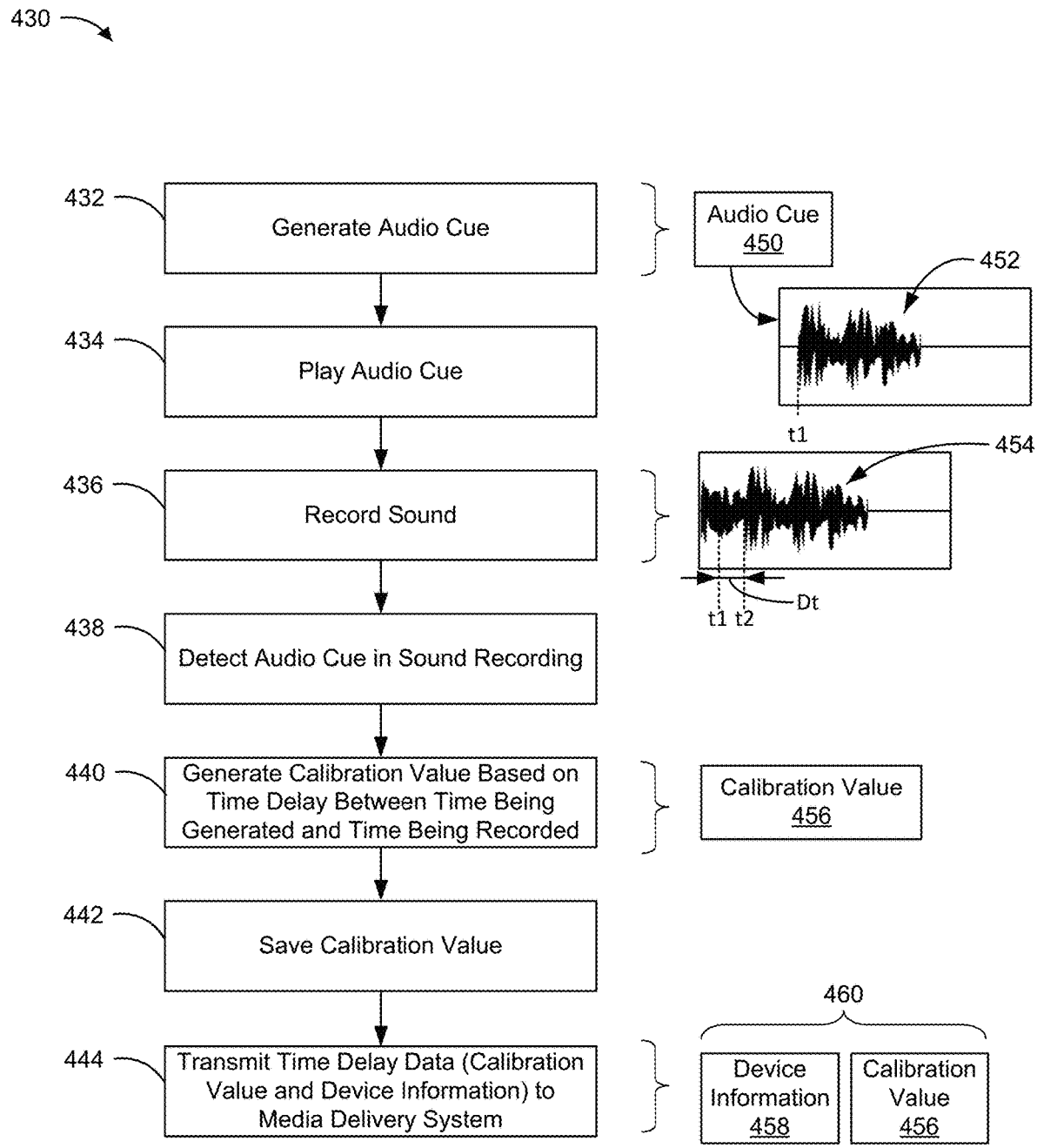
FIG. 5 is a flowchart of an example method for performing a calibration operation of FIG. 4.

FIG. 5 is a flowchart of an example method 430 for performing the calibration operation of FIG. 4. In some embodiments, the method 430 is performed by the sound system 102 including the media playback device 112 and the audio output device 114. The sound system 102 can execute the method 430 with or without communicating with at least one other computing device, such as the media delivery system 104.

As illustrated in FIG. 5, the method 430 can be performed once the media playback device 112 is paired with the audio output device 114 (at the operation 402) using a wireless communication, such as BLUETOOTH.

In some embodiments, the method 430 is performed automatically once the pairing has been completed. For example, the method 430 is executed for calibration as part of an activation process when the media playback device 112 is connected with the audio output device 114 for the first time. In other examples, the method 430 can be performed every time that the media playback device 112 is connected with the audio output device 114. In yet other examples, the method 430 can be performed periodically or randomly when the media playback device 112 is connected with the audio output device 114.

In other embodiments, the method 430 can be performed upon user request. For example, the media playback device 112 provides a user settings menu that includes an audio calibration option. The user may choose the audio calibration option from the settings menu to initiate the method 430. In embodiments where media content is being played in the sound system 102, the media content can be paused or stopped when the audio calibration option is selected. Alternatively, the media content being currently played can continue to be played while the method 430 is performed.

In some embodiments, the method 430 can be performed before the audio cancellation operation 406 (FIG. 4) is executed. In other embodiments, if the audio cancellation operation 406 has been performed, the method 430 can be performed when the audio cancellation operation 406 (FIG. 4) is paused or stopped. The audio cancellation operation 406 can resume or restart when the method 430 has been completed.

Referring still to FIG. 5, the method 430 can begin at operation 432 in which the sound system 102 generates an audio cue 450. In some embodiments, the media playback device 112 operates to generate the audio cue 450, and transmit the audio cue 450 to the audio output device 114 via the wireless communication network 126 (FIG. 1).

In some embodiments, the audio cue 450 can have a characteristic suitable for audio calibration. For better results, the audio cue 450 and the analysis technique used for calibration can both be insensitive to distortion. For example, the audio cue 450 has non-stationary and/or non-repeating statistics that are insensitive to distortion produced by the sound system 102. One example of the audio cue 450 includes a simple Dirac impulse, which can be modeled by a Dirac delta function. In embodiments where the media playback device 112 and the audio output device 114 are wirelessly connected, as described herein, a time delay value (and thus a calibration 456) can be measured by using a cross-correlation of the audio cue 450 being generated at the media playback device 112 and its reproduction through the audio output device 114. If an audio cue 450 other than a Dirac impulse is used, other techniques besides cross-correlation may be used. To obtain accurate measurement of the time delay, the audio cue 450 can be a signal configured not to be distorted so that the waveform of the audio cue 450 is at least generally maintained and, thus, the waveform of the reproduction of the audio cue 450 is not significantly different from the original waveform of the audio cue 450 on a sample level. In other embodiments, the audio cue 450 can have other characteristics.

In some embodiments, the audio cue 450 includes a single tone with a single frequency. In other embodiments, the audio cue 450 includes a single complex tone with multiple frequencies synthesized. In the illustrated example of FIG. 5, the audio cue 450 is generated and emitted once, and recorded. Alternatively, the audio cue 450 includes a plurality of different tones which are generated and played at different times. Such an alternative example is illustrated and described with reference to FIGS. 6 and 7.

The audio cue 450 can be of various types. An example audio cue may be a non-verbal response or a verbal response. An example non-verbal response may be selected from a beep, signal, ding, or other similar sound. An example verbal response can include one or more words or phrases, or a short sentence.

In some embodiments, the audio cue 450 can be branded and configured to project a predetermined characteristic, instead of using a single or a series of robotic bleeps and/or bloops. This can improve the user experience with the calibration mode. Further, where the calibration process is performed immediately after the pairing process has been completed, the audio cue 450 can also be used to inform that the pairing has been completed, as well as to obtain the calibration value 456. This way, the calibration process can be hidden from the user, and the user may only think that the pairing process has been performed and completed. This also enhances the user experience with the sound system.

A sound signal that represents the audio cue 450 generated at the sound system 102, such as the media playback device 112, is illustrated as an audio cue signal 452. In the illustrated example, the audio cue signal 452 is generated from a first time (t1).

At operation 434, the sound system 102 operates to play the audio cue 450. In some embodiments, the audio output device 114 operates to play the audio cue 450 that is transmitted from the media playback device 112. As illustrated in FIG. 1, the audio cue 450 can be emitted from the speaker 306 of the audio output device 114.

At operation 436, the sound system 102 operates to record sound there around. In some embodiments, the sound system 102 can operate to continuously record before and after the audio cue 450 is played. For example, the media playback device 112 operates to record sound around the media playback device 112 using the sound detection device 162 (e.g., at least one microphone). In some embodiments, the media playback device 112 operates to record at least part of the audio cue 450 being played from the audio output device 114. For example, the media playback device 112 operates to record at least the beginning of the audio cue 450 and continue to record at least part of the audio cue 450 thereafter.

A sound signal that represents the recording of the audio cue 450 emitted from the sound system 102, such as the audio output device 114, is illustrated as a recording signal 454. In the illustrated example, the sound system 102 started recording sound before the first time (t1) and continued to record after the second time (t2). In this example, the audio cue 450 appears from a second time (t2).

At operation 438, the sound system 102 operates to detect the audio cue 450 in the sound recording from the operation 436. For example, the sound system 102 analyzes the recording signal 454 and identifies the audio cue signal 452 in the recording signal 454. In the illustrated example, the audio cue signal 452 is identified from the second time (t2) in the recording signal 454. Various sound analysis techniques can be used to perform the operation 438.

At operation 440, the sound system 102 generates a calibration value 456 for audio cancellation in the sound system 102. In some embodiments, the calibration value 456 can be determined based on a time delay between the time of the audio cue 450 being generated and the time of the audio cue 450 being recorded. In the illustrated example, the calibration value 456 can be set as the time delay (Dt) between the second time (t2) and the first time (t1). In other embodiments, the calibration value 456 can consider other factors in addition to the time delay (Dt). Because the calibration value 456 is determined based on the time delay and does not involve other sophisticating calculations, the operation 440 is performed without requiring significant computing power and/or memory.

At operation 442, the sound system 102 operates to store the calibration value 456 to use it in the audio cancellation operation 406 (FIG. 4). In some embodiments, the media playback device 112 stores the calibration value 456 therein. The storage of the calibration value 456 locally in the sound system 102 is advantageous because the sound system 102 can use the calibration value 456 for subsequent audio cancellation operations repeatedly, without communicating with another computing device, such as the media delivery system 104, via the network 106. Further, the calibration value 456 can be adapted and adjusted as necessary without communicating with another computing device, such as the media delivery system 104, via the network 106.

At operation 444, in some embodiments, the sound system 102 operates to transmit delay data 460 to the media delivery system 104, and the media delivery system 104 can use the delay data 460 for tracking and analyzing the performance of audio cancellation in the sound system 102. Such tracking and analysis of audio cancellation operation can be used to provide solutions to improve the audio cancellation operation in the sound system 102, such as how to adjust the calibration value 456 for the particular sound system 102. In some embodiments, the delay data 460 includes the calibration value 456 and device information 458. The device information 458 can be used to identify the sound system 102 associated with the calibration value 456. The device information 458 includes information about the sound system 102, such as information about at least one of the media playback device 112 and the audio output device 114. The device information 458 includes at least one of a brand name, a model name, a version, a serial number, and any other information associated with the sound system 102, such as the media playback device 112 and/or the audio output device 114.

Figure 6:
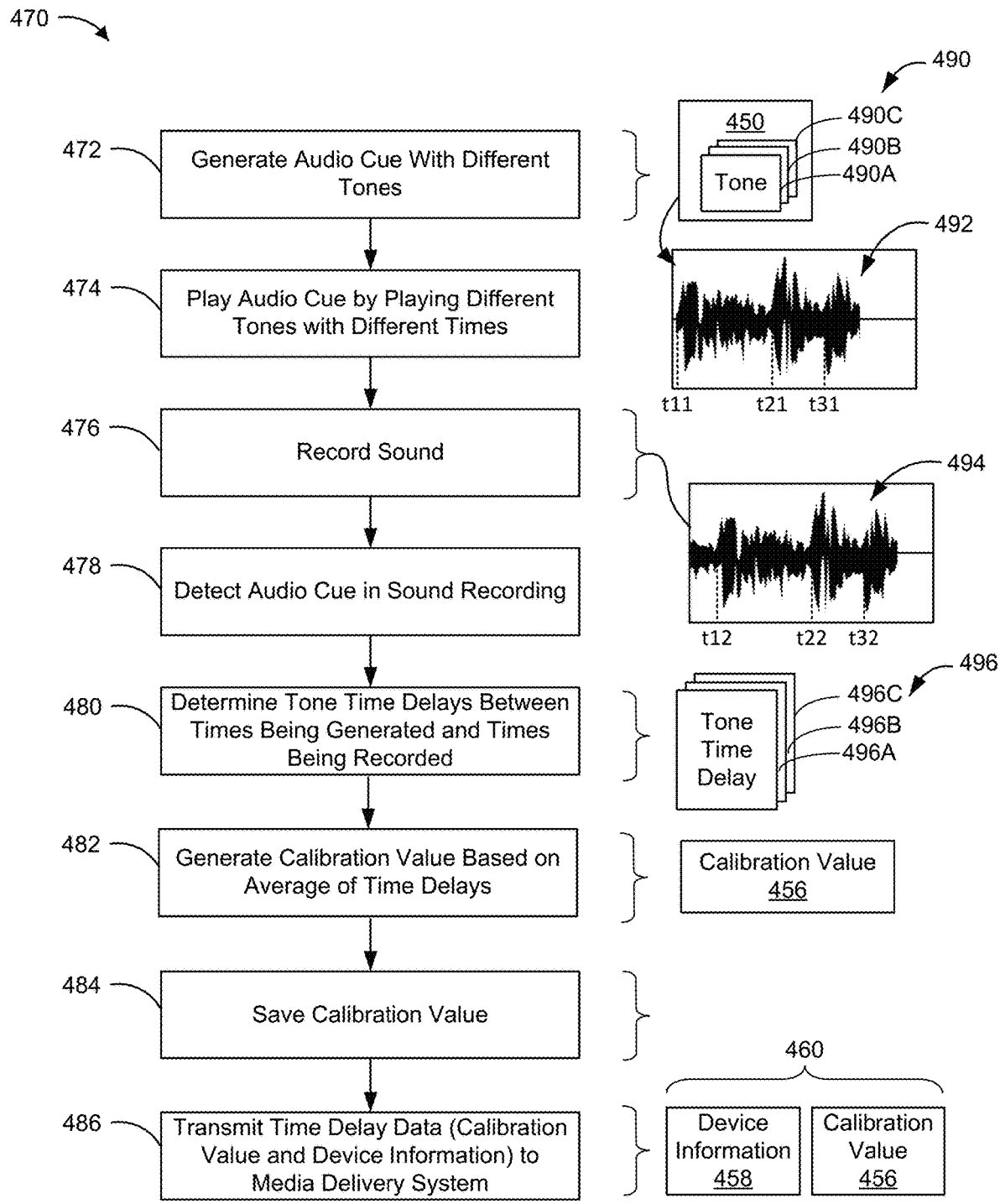
FIG. 6 is a flowchart of another example method for performing the calibration operation of FIG. 4.

FIG. 6 is a flowchart of another example method 470 for performing the calibration operation of FIG. 4. The method 470 is performed in a similar manner to the method 430 in FIG. 5 except that the audio cue 450 includes a plurality of different tones, each tone being generated and played at a different time. As many of the concepts and features are similar to the embodiment shown in FIG. 5, the description for the embodiment in FIG. 5 is equally relevant for the corresponding steps of the method 470. Where like or similar features or elements are shown, the same reference numbers will be used where possible. The following description for this embodiment will be limited primarily to the differences from the embodiment of FIG. 5.

The method 470 can begin at operation 472 that is similar to the operation 432. For example, at the operation 472, the sound system 102 generates the audio cue 450 that has a plurality of tones 490, each of which is generated at a different time. The tones 490 are configured to be distinct. For example, each tone 490 has a different frequency. Similar to the operation 432, the media playback device 112 operates to generate the audio cue 450, and transmit the audio cue 450 to the audio output device 114 via the wireless communication network 126 (FIG. 1).

A sound signal that represents the audio cue 450 with the plurality of tones 490 is illustrated as an audio cue signal 492. In the illustrated example, the audio cue signal 452 includes three different tones 490A, 490B, 490C (collectively, 490), each generated from different start times, such as a first start time (t11), a second start time (t21), and a third start time (t31). In other examples, a different number of tones 490 can be used for the audio cue 450.

The audio cue 450 with a plurality of different tones emitted at different times may be advantageous where the audio cue 450 can be sensitive to distortion when picked up by a microphone of the sound system 102. The approach described in FIG. 6 uses statistical measurements on a signal (i.e., the audio cue 450) instead of using the signal itself. The approach of this method allows the measurement of the calibration value to happen on a very low-powered device. In some embodiments, the method can utilize a Goertzel algorithm (as further described with reference to FIG. 7), which can be configured to measure the power of a specific frequency with very little computational complexity.

Figure 7:
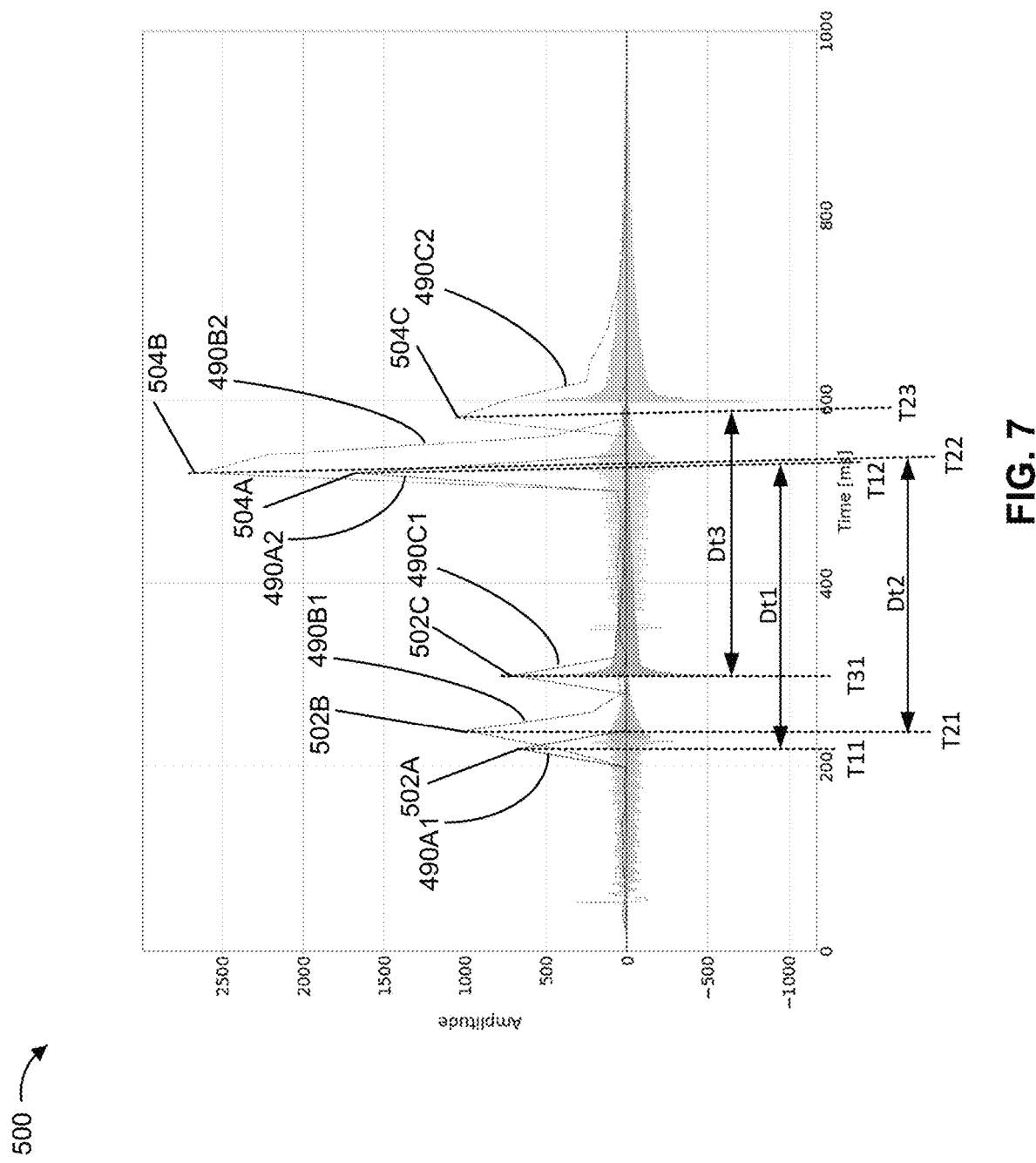
FIG. 7 illustrates an example method for determining a calibration value as shown in FIG. 6 where an audio cue includes a plurality of different tones.

In some embodiments, the audio cue 450 is configured to have a plurality of sine tones for major harmonic components (e.g., 3 sine tones as shown in FIG. 7), each of which has a strong peak volume at a separate time. The measurement of each tone involves measuring the power of its known frequency across time and finding the peak thereof. As described above, in certain embodiments, a Goertzel function can be configured and used to perform the measurements.

At operation 474, the sound system 102 operates to play the audio cue 450, similar to the operation 434. For example, the different tones 490 of the audio cue 450 are played at different times. As illustrated in FIG. 1, the audio cue 450 can be emitted from the speaker 306 of the audio output device 114.

At operation 476, the sound system 102 operates to record sound there around, similar to the operation 436. A sound signal that represents the recording of the audio cue 450 emitted from the sound system 102, such as the audio output device 114, is illustrated as a recording signal 494. In the illustrated example, the sound system 102 started recording sound before the first start time (t11) and continued to record after the third start time (t31). In this example, in the recording, the tones 490 of the audio cue 450 appear from a first detect time (t12), a second detect time (t22), and a third detect time (t32), respectively.

At operation 478, the sound system 102 operates to detect the audio cue 450 in the sound recording from the operation 436, similar to the operation 438. In some embodiments, the sound system 102 analyzes the recording signal 454 and identifies the audio cue signal 452 in the recording signal 454. In the illustrated example, the three different tones 490 in the audio cue signal 492 are identified from the first detect time (t12), the second detect time (t22), and the third detect time (t32), respectively, in the recording signal 494.

At operation 480, the sound system 102 operates to determine tone time delays 496 (including 496A, 496B, and 496C) (Dt) for the audio cue 450. In some embodiments, for each tone 490, a time delay (Dt) is calculated from a difference between the time of the tone 490 being generated and the time of the tone 490 being recorded. In the illustrated example, a first time delay (Dt1) for a first tone 490A (i.e., a first tone time delay 496A) is a difference (t12−t11) between the first detect time (t12) and the first start time (t11). A second time delay (Dt2) for a second tone 490B (i.e., a second tone time delay 496B) is a difference (t22−t21) between the second detect time (t22) and the second start time (t21). A third time delay (Dt3) for a third tone 490C (i.e., a third tone time delay 496C) is a difference (t32−t31) between the third detect time (t32) and the third start time (t31).

At operation 482, the sound system 102 operates to generate the calibration value 456 for audio cancellation in the sound system 102. In some embodiments, the calibration value 456 can be determined based at least in part on the tone time delays 496 (Dt1, Dt2, and Dt3) obtained at the operation 480. In some embodiments, the calibration value 456 can be determined as an average value (e.g., mean or mean average) of the tone time delays 496. In other embodiments, other value can be calculated from the tone time delays 496 and used to determine the calibration value 456. In still other embodiments, the calibration value 456 can consider other factors in addition to the tone time delays 496.

In some embodiments, the method 470 can continue at operations 484 and 486. The operations 484 and 486 are performed similarly to the operations 442 and 444 in FIG. 5, and thus the description thereof is omitted for brevity purposes.

FIG. 7 illustrates an example method 500 for determining the calibration value 456 as shown in FIG. 6 where the audio cue 450 includes a plurality of different tones 490.

In some embodiments, the calibration value 456 is calculated using a Goertzel algorithm. The Goertzel algorithm can perform tone detection using much less computing power than a Fast Fourier Transform (FFT). The Goertzel algorithm of the present disclosure can be configured to calculate the power of a single frequency bin, as opposed to a plurality of frequencies, and thus can save computing cycles.

As applied herein, in embodiments where three distinct tones 490A, 490B, and 490C (collectively 490) with different frequencies are used for the audio cue 450, a time position (e.g., a first time position) of a peak in the frequency of each tone 490 being generated, and a time position (e.g., a second time position) of a peak in the frequency of each tone 490 being recorded, are detected. Then, a difference between the first time position and the second time position is determined for each tone 490. Once the time differences are determined for all the tones 490, an average value of the time differences is calculated and can then be used for the calibration value 456. Various types of average values can be used. In some embodiments, a mean value is used for the average value. In other embodiments, a median is used for the average value. In still other embodiments, a mode is used for the average value.

In the illustrated example of FIG. 7, the first tone 490A1 being generated has a peak frequency 502A at time T11, and the first tone 490A2 being recorded has a peak frequency 504A at time T12. A time difference (Dt1) between the time position T11 of the peak frequency 502A and the time position T12 of the peak frequency 504A is then calculated as T12−T11. Similarly, the second tone 490B1 being generated has a peak frequency 504A at time T21, and the second tone 490B2 being recorded has a peak frequency 504B at time T22. A time difference (Dt2) between the time position T21 of the peak frequency 502B and the time position T22 of the peak frequency 504B is then calculated as T22-T21. Similarly, the third tone 490C1 being generated has a peak frequency 504C at time T31, and the third tone 490C2 being recorded has a peak frequency 504C at time T32. A time difference (Dt3) between the time position T31 of the peak frequency 502C and the time position T32 of the peak frequency 504C is then calculated as T32-T31. Then, a mean average of the time differences (Dt1, Dt2, and Dt3) is calculated as a time delay (Dt), and can be used as the calibration value 456. In other examples, other types of average values, such as median or mode, can be calculated as the time delay (Dt).

Figure 8:
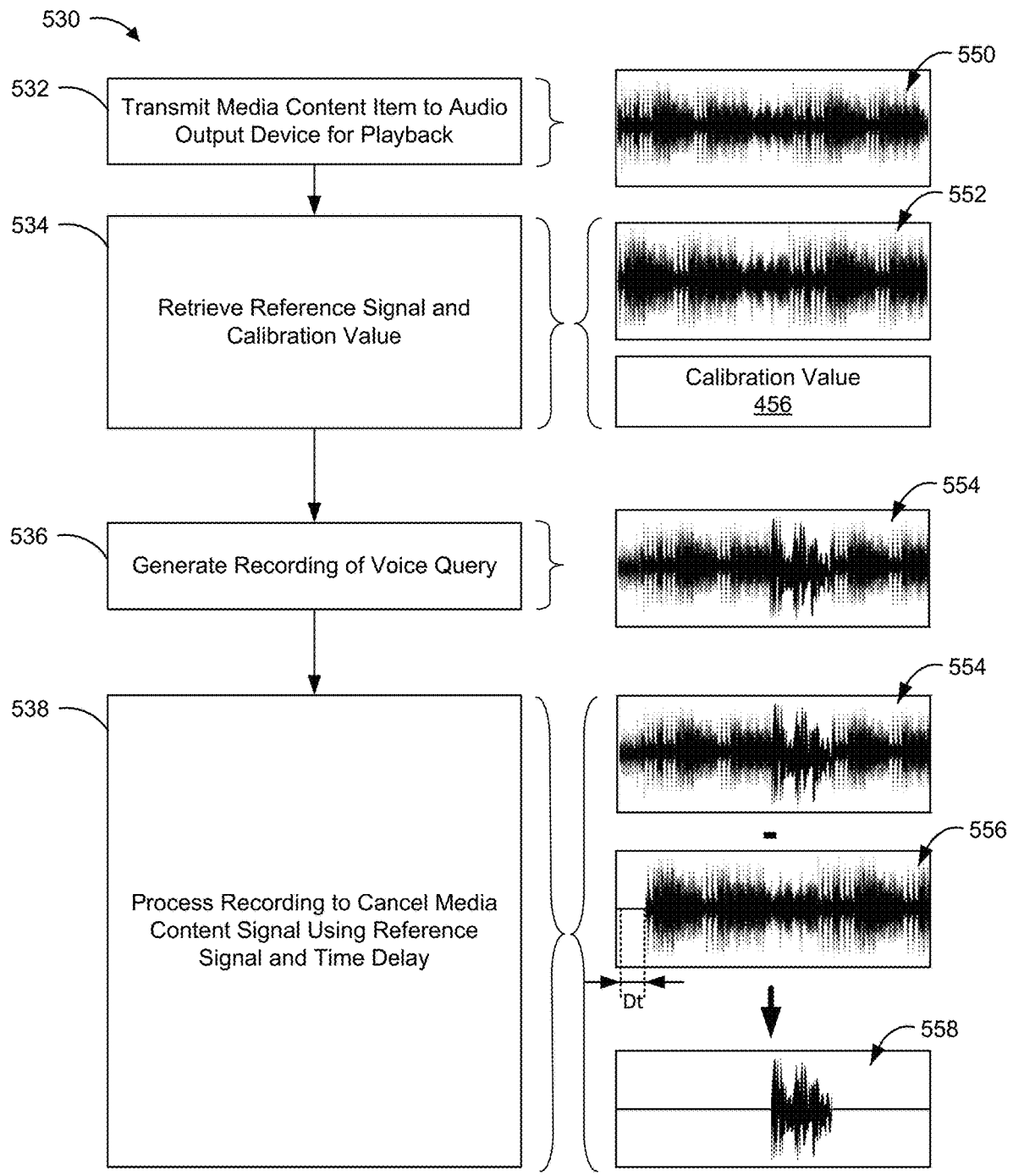
FIG. 8 is a flowchart of an example method for performing an audio cancellation operation of FIG. 4.

FIG. 8 is a flowchart of an example method 530 for performing the audio cancellation operation 406 of FIG. 4. In some embodiments, the method 530 is performed by the sound system 102 including the media playback device 112 and the audio output device 114. The sound system 102 can execute the method 530 with or without communicating with at least one other computing device, such as the media delivery system 104.

In some embodiments, the method 530 can be performed while the sound system 102 plays media content, such as while the media playback device 112 transmits media content to the audio output device 114 that plays the media content (e.g., the media output 124 in FIG. 1). As described herein, the method 530 is executed to identify the user's voice query by canceling the media content from the audio recorded at the sound system 102. In other embodiments, the method 530 can be used while there is no media content being played. The method 530 can be similarly applied to cancel ambient sounds (e.g., noise) from the audio recorded at the sound system 102 and identify the user's voice query from the audio recording.

The method 530 can begin at operation 532 in which the media playback device 112 operates to transmit a media content item 234 to the audio output device 114 via the wireless communication network 126. The media content item transmitted to the audio output device 114 can be played at the audio output device 114. In some embodiments, the media content item 234 can be selected from one of the media content items that have been transmitted from the media delivery system 104 and stored in the memory device 150 of the media playback device 112. A sound signal that represents the media content item 234 being generated and transmitted from the media playback device 112 is illustrated as a media content signal 550.

At operation 534, the sound system 102 retrieves a reference signal 552 and the calibration value 456. The reference signal 552 can be generated to cancel the media content signal 550 from a sound recording at subsequent process. In some embodiments, the sound system 102 operates to generate the reference signal 552 based on the media content item 234. In other embodiments, the reference signal 552 is obtained from another computing device, such as the media delivery system 104.

At operation 536, the sound system 102 operates to generate a recording of a voice query 120 (FIG. 1). In some embodiments, while the media content item 234 is being played from the audio output device 114, the user U may provide a voice-command, and the media playback device 112 receives the voice query 120 and generates the recording of the voice query 120. Therefore, the recording of the voice query 120 can also include at least part of the sound of the media content item 234 being currently played around the media playback device 112. In addition or alternatively, when the media playback device 112 receives the user query 120, other sounds, such as ambient noise, can also be recorded at the media playback device 112 and mixed with the user query 120. A sound signal that represents the recording of the voice query 120 that is mixed with other sounds (e.g., the media content item being played and/or ambient sounds) around the media playback device 112 is illustrated as a recorded audio signal 554.

At operation 538, the sound system 102 operates to process the recorded audio signal 554 to cancel the media content signal 550 and identify the voice query 120. In some embodiments, the reference signal 552 and the calibration value 456 are used for the cancellation process. For example, the reference signal 552 is adjusted by the calibration value 456 to be suitable to cancel the media content signal 550 from the recorded audio signal 554. In some embodiments, the reference signal 552 has a time delay (Dt), which is used to cancel the media content signal 550 out from the recorded audio signal 554, thereby providing a voice query signal 558 that identifies the voice query 120.

Figure 9:
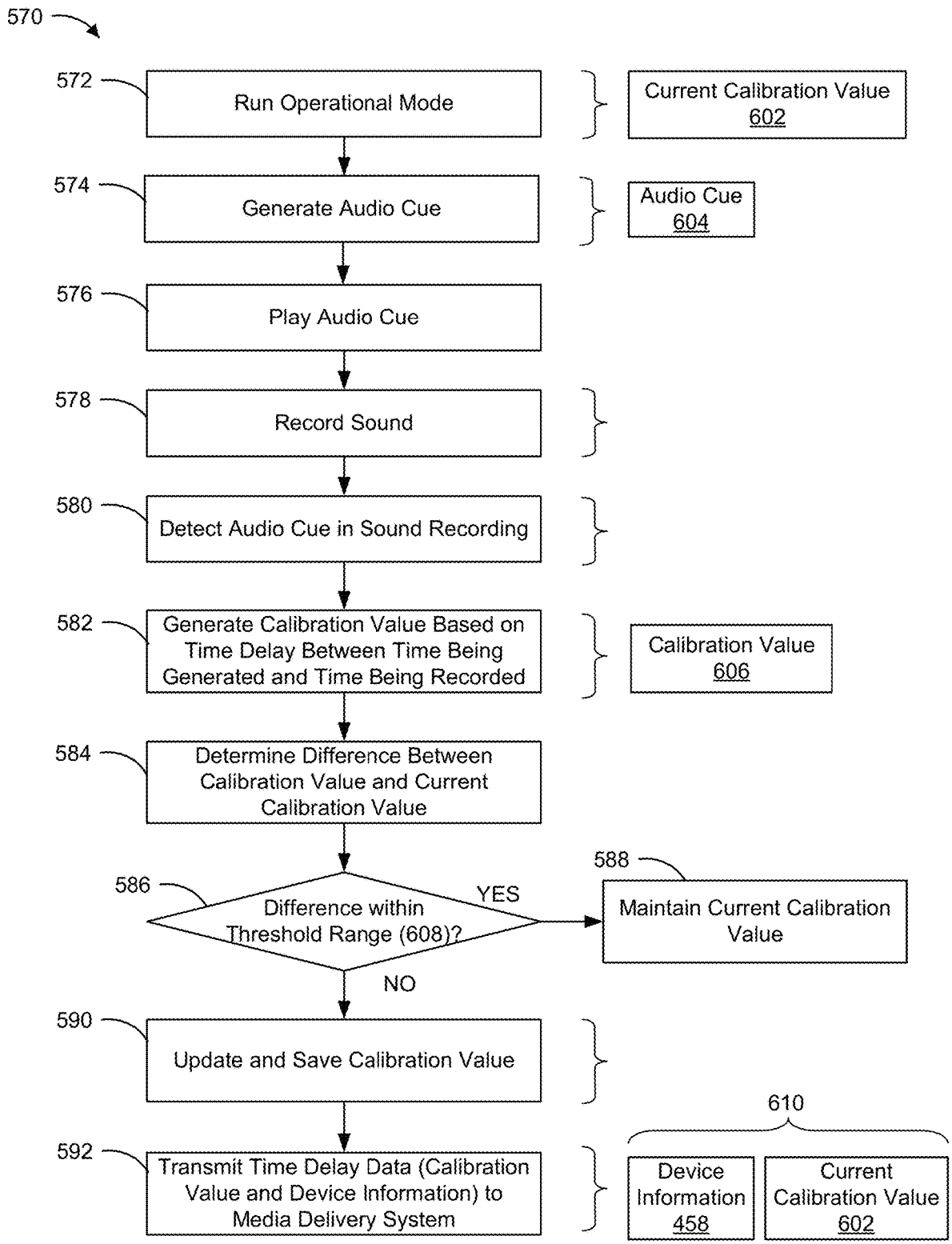
FIG. 9 is a flowchart of an example method for performing a calibration validation and adaptation operation of FIG. 4.

FIG. 9 is a flowchart of an example method 570 for performing the calibration validation and adaptation operation 408 of FIG. 4. In some embodiments, the method 570 is performed by the sound system 102 including the media playback device 112 and the audio output device 114. The sound system 102 can execute the method 570 with or without communicating with at least one other computing device, such as the media delivery system 104.

The method 570 is performed to validate the calibration performed by the method 430, 470 while the sound system 102 is in operation performing the audio cancellation. The method 570 can be executed to validate the calibration value 456 obtained at the calibration operation and adjust the calibration value 456 to adapt the real-time operation of the sound system 102. The validation and/or adaptation operation herein allows monitoring any change or adjustment on the wired or wireless connection between the media playback device 112 and the audio output device 114 during operation, and automatically incorporating the change or adjustment in the calibration value in real time.

In some embodiments, the validation and/or adaptation operation herein can be performed while the sound system 102 is in operation where the sound system 102 can play media content. Therefore, the validation and/or adaptation operation does not need to stop or pause the normal operation of the sound system 102. In other embodiments, however, the validation and/or adaptation operation can be performed while media content playback is stopped or paused.

The method 570 can begin at operation 572 in which the sound system 102 runs in its operational mode. In the operational mode, the sound system 102 can perform the audio cancellation by the method 530 as described with reference to FIG. 8. In the operational mode, the sound system 102 stores a current calibration value 602 and uses it for the audio cancellation by the method 530. The current calibration value 602 can be the calibration value 456 if the calibration operation has been performed and there has been no change to the calibration value 456.

At operation 574, the sound system 102 generates an audio cue 604, similar to the operations 432, 472. In some embodiments, the media playback device 112 operates to generate the audio cue 604, and transmit the audio cue 604 to the audio output device 114 via the wireless communication network 126 (FIG. 1). In some embodiments, the audio cue 604 is identical to the audio cue 450 that has been used in the calibration operation. In other embodiments, the audio cue 604 is different from the audio cue 450.

At operation 576, the sound system 102 operates to play the audio cue 604, similar to the operations 434, 474. In some embodiments, the audio output device 114 operates to play the audio cue 604 that is transmitted from the media playback device 112. As illustrated in FIG. 1, the audio cue 604 can be emitted from the speaker 306 of the audio output device 114.

At operation 578, the sound system 102 operates to record sound there around, similar to the operations 436, 476. In some embodiments, the sound system 102 can operate to continuously record before and after the audio cue 604 is played. For example, the media playback device 112 operates to record sound around the media playback device 112 using the sound detection device 162 (e.g., at least one microphone). In some embodiments, the media playback device 112 operates to record at least part of the audio cue 604 being played from the audio output device 114. For example, the media playback device 112 operates to record at least the beginning of the audio cue 604 and continue to record at least part of the audio cue 604 thereafter.

At operation 580, the sound system 102 operates to detect the audio cue 604 in the sound recording from the operation 578, similar to the operations 438, 478. For example, similar to the operations 438, 487, the sound system 102 analyzes the recording signal and identifies the audio cue signal in the recording signal.

At operation 582, the sound system 102 generates a calibration value 606, similar to the operations 440, 482. In some embodiments, as described herein, the calibration value 606 can be determined in a way similar to the calibration value 456. For example, the calibration value 606 can be determined based on a time delay between the time of the audio cue 604 being generated and the time of the audio cue 604 being recorded.

At operation 584, the sound system 102 operates to determine a difference between the calibration value 606 and the current calibration value 602.

At operation 586, the sound system 102 operates to determine whether the difference between the calibration value 606 and the current calibration value 602 falls within a threshold range 608. If the difference is within the threshold range 608 ("YES"), the method 570 moves on to operation 588 in which the sound system 102 maintains the current calibration value 606. If the different is not within the threshold range 608 ("NO"), the method 570 continues at operation 590.

The threshold range 608 can be determined in light of a deviation from the calibration value that does not affect the accuracy and effectiveness of the audio cancellation operation. In some embodiments, the threshold range 608 can be +/−20 milliseconds. In other embodiments, the threshold range 608 can be between about +/−10 milliseconds and about +/−30 milliseconds. In yet other embodiments, the threshold range 608 can be between about +/−5 milliseconds and about +/−50 milliseconds. Other ranges can also possible for the threshold range 608.

At operation 590, the sound system 102 operates to update the current calibration value 602 with the calibration value 606, and save the updated current calibration value 602.

At operation 592, in some embodiments, similar to the operations 444, 486, the sound system 102 operates to transmit delay data 610 to the media delivery system 104, and the media delivery system 104 can use the delay data 610 for tracking and analyzing the performance of audio cancellation in the sound system 102. In some embodiments, the delay data 460 includes the current calibration value 602 and the device information 458 as described herein.

Figure 10:
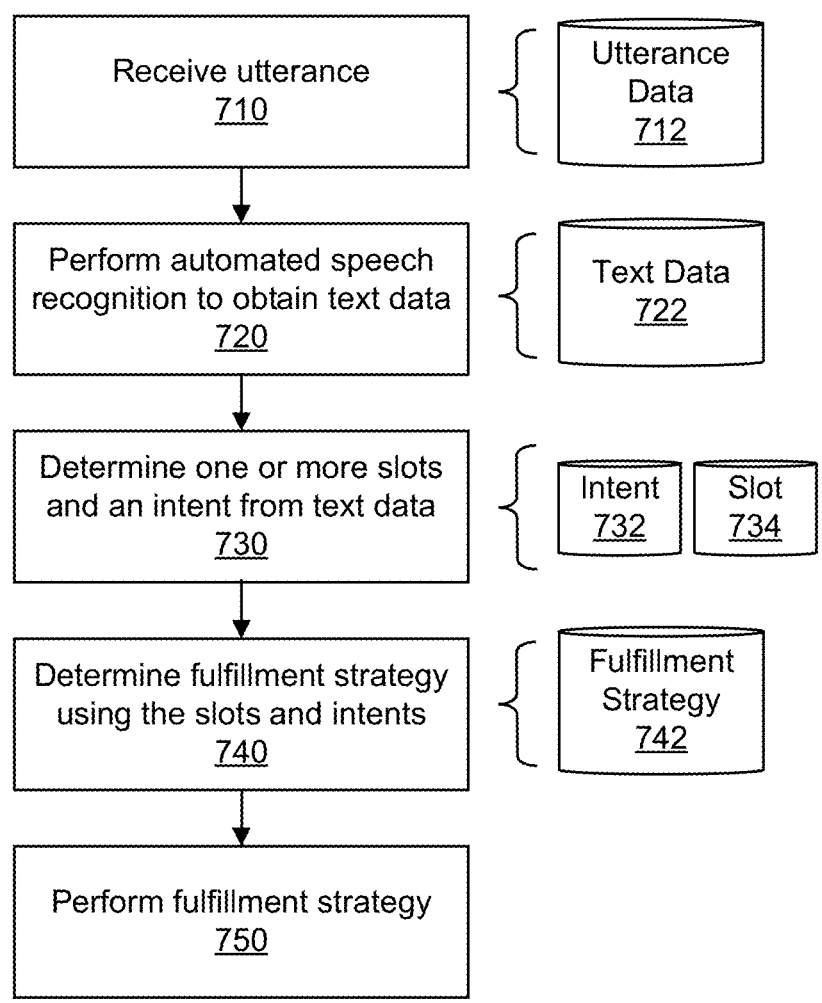
FIG. 10 illustrates an example method for performing a voice process operation of FIG. 4.

FIG. 10 illustrates an example method 700 for performing the voice process operation 410 of FIG. 4 based on the identified user query 120. In some embodiments, the method 700 can be performed at least partially by the media delivery system 104 (e.g., the voice interaction server 204, the user command interpretation server 206, and the media content search server 202). In addition, the method 700 can be performed at least partially by the media playback device 112 that operates to provide an utterance of the user query 120 to the media delivery system 104 for processing the method 700. Although it is primarily described that the method 700 is performed by the media delivery system 104, this is for example purposes only, and other configurations are possible. For instance, the method 700 can be local and performed at the media playback device 112 and any other computing device.

The method 700 can begin at operation 710, in which the media delivery system 104 includes receiving utterance data 712 (e.g., from the media playback device 112). The utterance data 712 is data describing the utterance of the user query 120 (e.g., the utterance 331). In some embodiments, the utterance data 712 is an audio recording that contains the utterance being spoken, such as the voice query signal 558 identified by the audio cancellation operation described herein. In some embodiments, the utterance data 712 is received as an entire audio data file. For instance, the media playback device 112 buffers the utterance data 712 as the utterance data 712 is obtained from the sound detection device 162. The buffered utterance data 712 is then sent to the media delivery system 104 for processing. In other instances, the media playback device 112 streams the utterance data 712 to the media delivery system 104 in real-time as the utterance data 712 is received from the sound detection device 162. In an example, the utterance data 712 is stored (e.g., by the media delivery system 104) in a data store after the utterance data 712 is received. After the utterance data 712 is received, the flow moves to operation 720.

Operation 720 includes performing automated speech recognition on the utterance data 712 to obtain text data 722. In some embodiments, performing automated speech recognition includes providing the utterance data 712 as input to an automated speech recognition system and receiving the text data 722 as output from the automated speech recognition system. Automated speech recognition can be performed using any of a variety of techniques (e.g., using hidden Markov models or neural networks). Examples of automated speech recognition systems include CMU SPHINX, maintained by CARNEGIE MELLON UNIVERSITY, and DEEPSPEECH, maintained by the MOZILLA FOUNDATION. After the text data 722 is obtained from the automated speech recognition system, the flow moves to operation 730.

Operation 730 includes determining a slot 734 and an intent 732 from the text data 722. The slot 734 is a key-value pair that describes a portion of the text data 722 having a specific meaning. The intent 732 describes a general intent of the text data 722. As a particular example, if the text data 722 were "play the song Thriller" as input, the intent 732 is "play" and the slot 734 would be the key-value pair {song: Thriller}. Although the example includes just one slot 734 and one intent 732, the output of operation 730 can be more than one slot 734 and more than one intent 732. There are also instances, where there is an intent 732 but no slot 734. For instance, performing operation 730 where the text data 722 is "play" would result in the intent 732 being "play", but would not result in any slots 734 (e.g., the text data 722 does not include a description of what to play). In such an example, a request associated with the utterance is determined to be ambiguous responsive to determining that there is a play intent without a slot. In other instances, there are slots 734 but no intent. For instance, performing operation 730 where the text data 722 is "All Along the Watchtower by Jimi Hendrix" would result in two slots 734 (e.g., {Song: All Along the Watchtower, Artist: Jimi Hendrix}) but no intent 732 (e.g., the text data 722 does not include a description of what to do with the song and artist, such as search, play, or save).

In some embodiments, the operation 730 is performed by a natural language understanding model that is trained to identify the slot 734 and intent 732 for the text data 722 provided as input. The natural language understanding model can be implemented in a variety of ways, including using a state vector machine or a conditional random fields model, among others. With the intent 732 and the slots 734 determined, the flow moves to operation 740.

Operation 740 includes determining a fulfillment strategy 742 using the slot 734 and the intent 732. The fulfillment strategy 742 is a course of action to take which is typically associated with execution of a command or service associated with the intent 732. For instance, where the intent 732 is a play intent, the fulfillment strategy 742 is a play fulfillment strategy and involves the execution of a play command. In an example, there is a fulfillment manager and the operation 740 includes the fulfillment manager selecting the fulfillment strategy 742 from among a plurality of fulfillment strategies. In an example, the fulfillment manager follows a decision tree based the intent 732 and the slot 734. In another example, the fulfillment strategy 742 defines requirements (e.g., a play fulfillment strategy may require a play intent) and the fulfillment manager selects the fulfillment strategy 742 from among the fulfillment strategies based on requirements being met or unmet. In an example, the fulfillment strategy 742 is a disambiguation fulfillment strategy, such as one that causes execution of a disambiguation process. Once the fulfillment strategy 742 is selected, the flow moves to operation 750.

At operation 750, the fulfillment strategy 742 is performed. For example, where the fulfillment strategy 742 is a play fulfillment strategy 742, a media content item associated the slot 734 is selected and playback of the media content item is initiated. In another example, the fulfillment strategy 742 is a list playlists strategy that involves selecting one or more playlists and providing the list as output.

Referring again to FIG. 6, the sound system 102 can generate an audio cue 450, in step 472. The audio cue 450 can have a different signal configuration than that of the plurality of tones 490 previously described. The different audio cue 450 can include a signal 1102 that may be as shown in FIGS. 11 through 14. The signal 1102 can include a unique set of characteristics making the signal 1102 easier to identify when used in the method 470 of FIG. 6. These characteristics will be described hereinafter in conjunction with FIGS. 11 and 13.

Figure 11:
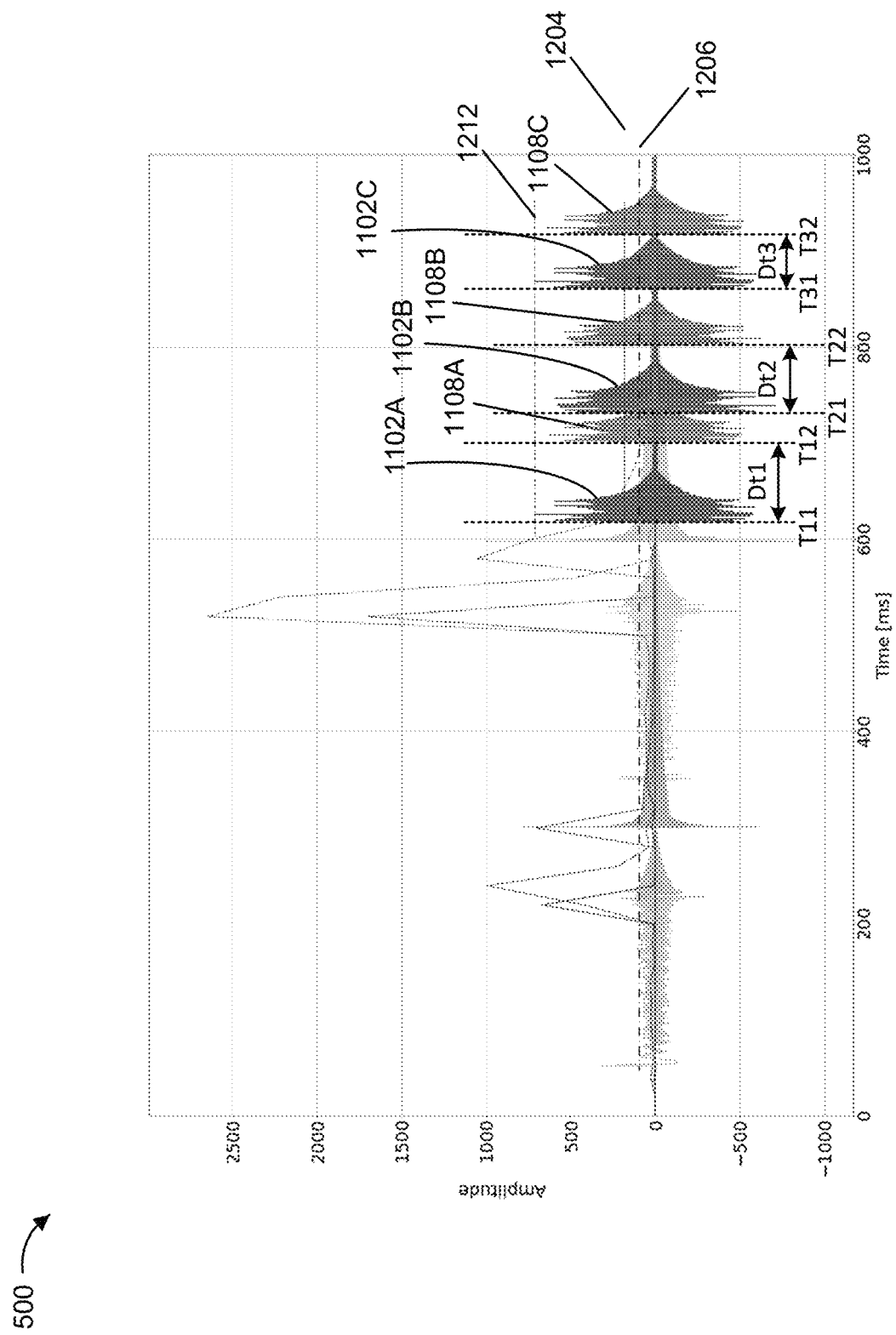
FIG. 11 illustrates another example method for determining a calibration value as shown in FIG. 6 where an audio cue includes a plurality of different signals.
Figure 12:
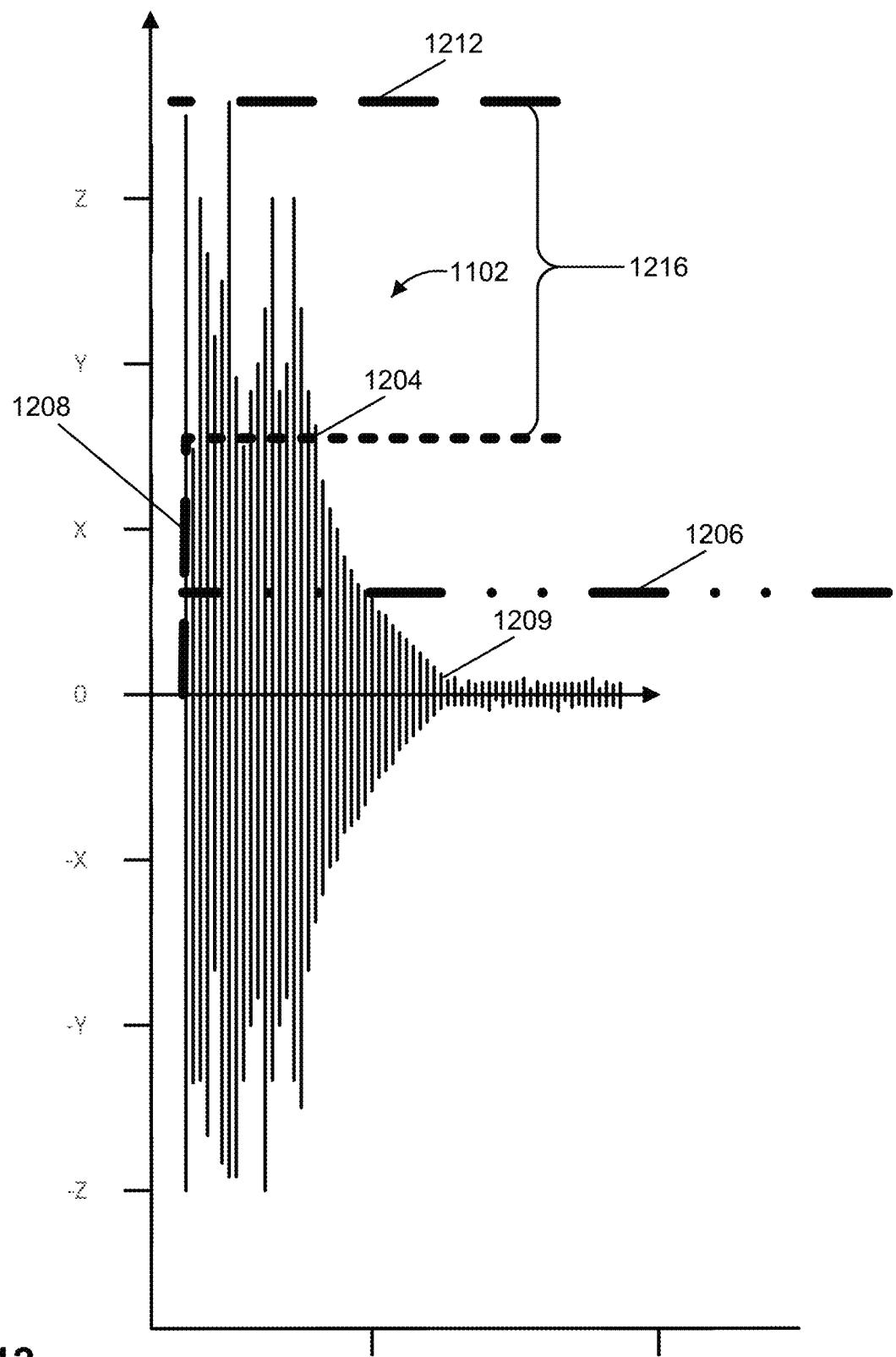
FIG. 12 illustrates an example signal used as an audio cue in the method for determining a calibration value as shown in FIG. 6 and FIG. 11.

The signal 1102, as shown in FIGS. 11 and 12, can include a root mean square (RMS) value higher than the background noise and a large crest factor, which is a large difference 1216 between the RMS 1204 and the peak signal power 1212. As understood by one skilled in the art, the RMS 1204 is equal to the value of the direct-current that would produce the same average power dissipation in some type of resistive load. In other words, the RMS 1204 is an estimation of the average power output of the signal. The signal 1102 can have a high RMS value 1204 meaning that the power in the signal is greater than other signals, for example, the audio signals generated in the background, for example, the RMS of background noise that may be at level 1206. Thus, the RMS 1204 of the signal 1102 is higher than the RMS 1206 of the background noise.

Background noise may generally be any sound or audio signal that emanates from or is generated by a source different from the sound system. The background noise can include sound that may emanate from a motor vehicle or noises associated with the operation of a motor vehicle, for example, engine noise, wind noise, traffic noise. In other environments, the background noise may be associated with a room or building where the sound system is located and may be associated with the sound of a person talking, background music, sound of a television, or other ambient noises in the environment, for example, nature sounds (e.g., wind, birds, etc.), urban environment noises (e.g., construction noises, sirens, etc.), mechanical noises (e.g., electrical humming, sounds from an appliance, buzzing from lights, etc.), white noise, or other noise.

The signal 1102 used as an audio cue 450 can also include a strong attack. The attack of the signal is the relative slope of the line from the signal beginning to the point at which the signal reaches the RMS value 1204 or peak signal power. The strong attack of signal 1102 is represented by line 1208. A more vertical line 1208 represents a stronger attack. In other words, the rising edge of the transition from the low value of the signal (or start of the signal) to the high value of the signal happens within a small period of time, for example, within milliseconds, for example 1 to 100 milliseconds. In some configurations, the attack characteristic or the slope of the rising edge of the signal 1102 can be in the range of picoseconds or microseconds.

Figure 13:
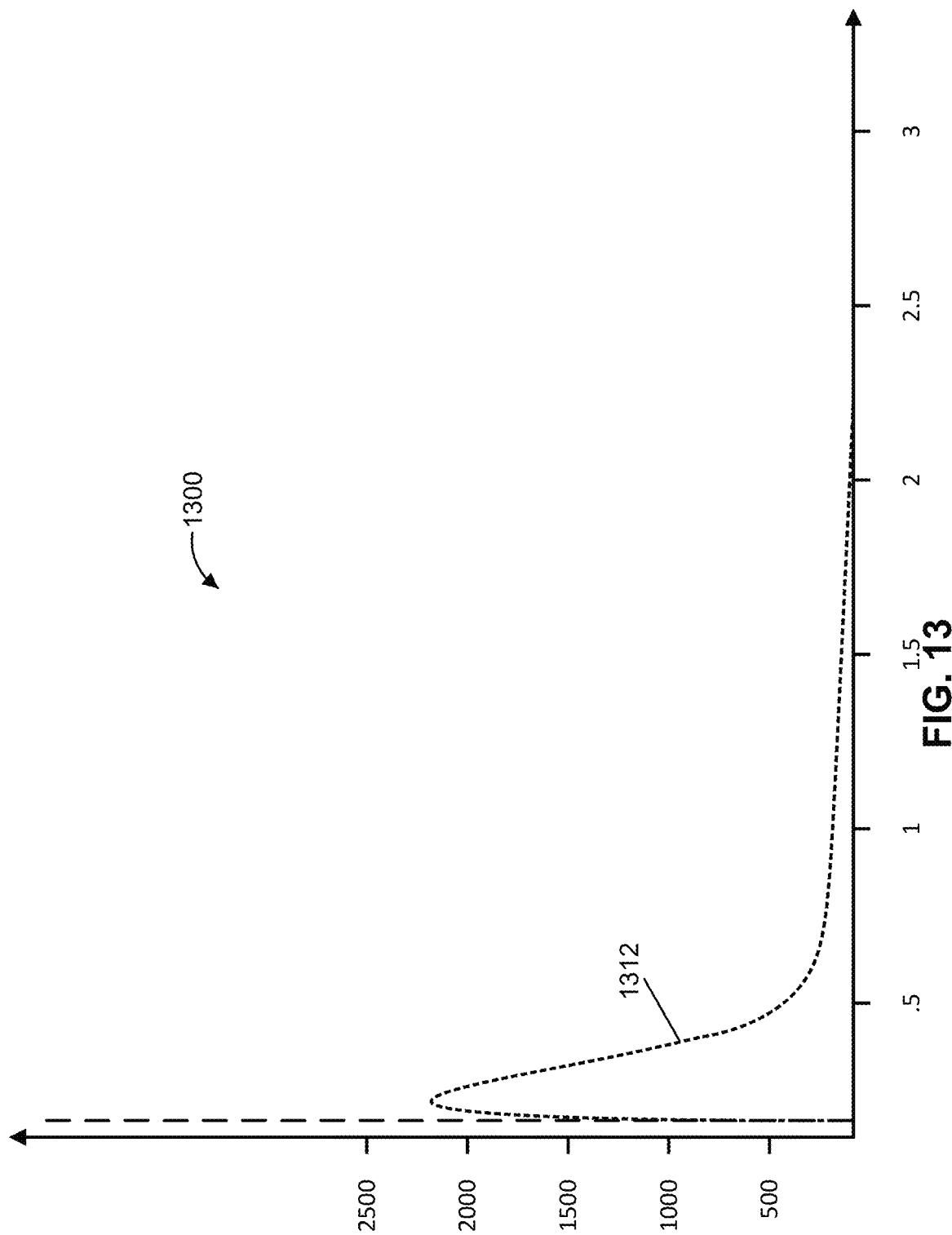
FIG. 13 illustrates an example signal used as an audio cue in the method for determining a calibration value as shown in FIG. 6 and FIG. 11.

FIG. 13 shows a representation of the numerous different frequencies that may be part of the signal 1102. The chart provides for the different frequencies on the vertical axis. The horizontal axis provides for the time during playback. As shown in the chart 1300 of FIG. 13, the signal 1102 can contain two or more different frequencies, which, for example, can include any frequency below line 1312 at any time during the playback of signal 1102. The area under the line 1312 represents the frequencies contained within signal 1102 during playback. Thus, the higher the value of line 1312, the more frequencies that are in the signal at that time. As such, signal 1102 can include two or more or a plurality of frequencies during playback. In some configurations, the signal 1102 does not include any harmonics. Further, the signal 1102 can include the two or more frequencies during any portion of the time required for signal playback. In at least some configurations, the signal 1102 may be a strike to or the sound emanating from a snare drum.

The signal 1102 can be configured to be distinct. For example, each signal 1102 may have a plurality of frequencies. Similar to the operation 432, the media playback device 112 operates to generate the audio cue 450, and transmit the audio cue 450 to the audio output device 114 via the wireless communication network 126 (FIG. 1).

Figure 14:
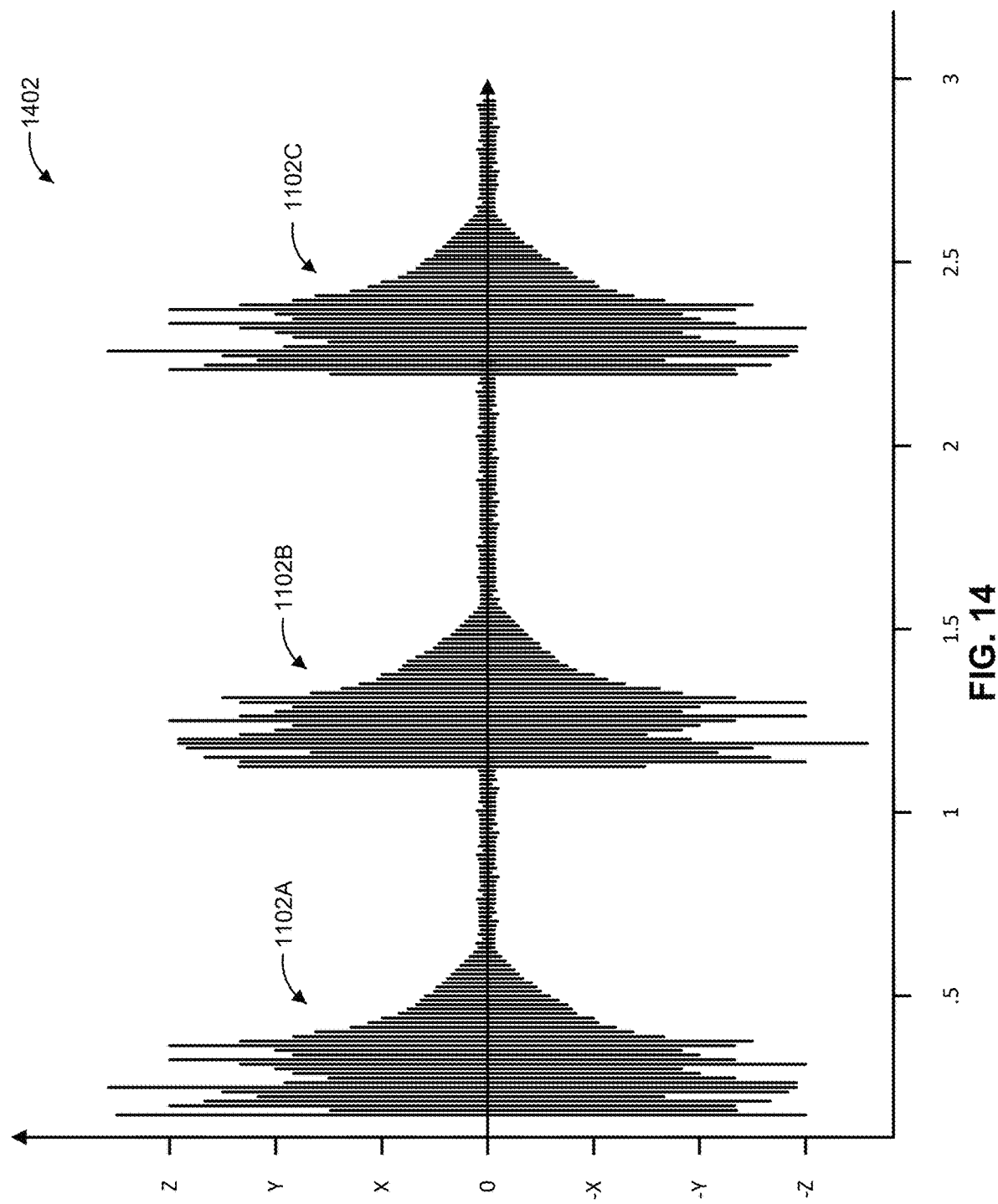
FIG. 14 illustrates example signals used as audio cues in the method for determining a calibration value as shown in FIG. 6 and FIG. 11.

The sound signal 1402, which represents the audio cue 450, can also include a plurality (two or more) of signals 1102, as is illustrated as audio cue signal 1402 in FIG. 14. In the illustrated example, the audio cue signal 1402 includes three different signals 1102A, 1102B, 1102C (collectively, 1402), each generated at different start times. For example, as shown in FIG. 11, signal 1102A has a first start time (t11), signal 1102B has a second start time (t21), and signal 1102C has a third start time (t31). In other examples, a different number of signals 1102 can be used for the audio cue 450.

The audio cue 450 with a plurality of different signals 1102 that emitted at different times may be advantageous where the audio cue 450 can be sensitive to distortion when picked up by a microphone of the sound system 102. The approach described in FIG. 6 uses statistical measurements on a signal (i.e., the audio cue 450) instead of using the signal itself. The approach of this method allows the measurement of the RMS-to-peak ratio of the signal 1102 to happen on a very low-powered device. In some embodiments, the method can utilize a Goertzel algorithm (as described in conjunction with FIG. 7), which can be configured to measure the maximum signal power with very little computational complexity.

In some embodiments, the RMS is determined through a converter, e.g., a digital RMS converter. The peak signal power may be as the maximum absolute value of the signal. These two measurements may then be compared to determine a RMS-to-peak ratio. If the RMS-to-peak ratio is over some predetermined threshold, e.g., 30 dB, the signal is deemed to be received. The signal 1102 may achieve the RMS-to-peak ratio at some period of time after the start of the signal 1102 before the signal 1102 is deemed received. However, with a strong attack, this period of time before signal reception is determined is small, e.g., within picoseconds or microseconds of the signal start, and does not substantially affect the calculation of the time delay.

At operation 474, the sound system 102 operates to play the audio cue 450, similar to the operation 434. For example, the different signals 1102A, 1102B, 1102C of the audio cue 450 (1402) are played at different times. The audio cue 450 can be emitted from the speaker 306 of the audio output device 114 (see FIGS. 2 and 3).

At operation 476, the sound system 102 operates to record sound there around, similar to the operation 436. The sound signals that represent the recordings of the audio cue 450 emitted from the sound system 102, such as the audio output device 114, are each illustrated as a recording signal 1108A, 1108B, and 1108C. In the illustrated example, the sound system 102 started recording sound before the first start time (t11) and continued to record after the third start time (t31). In this example, in the recording, the signals 1102A, 1102B, 1102C of the audio cue 450 appear from a first detect time (t12), a second detect time (t22), and a third detect time (t32), respectively.

Figure 15:
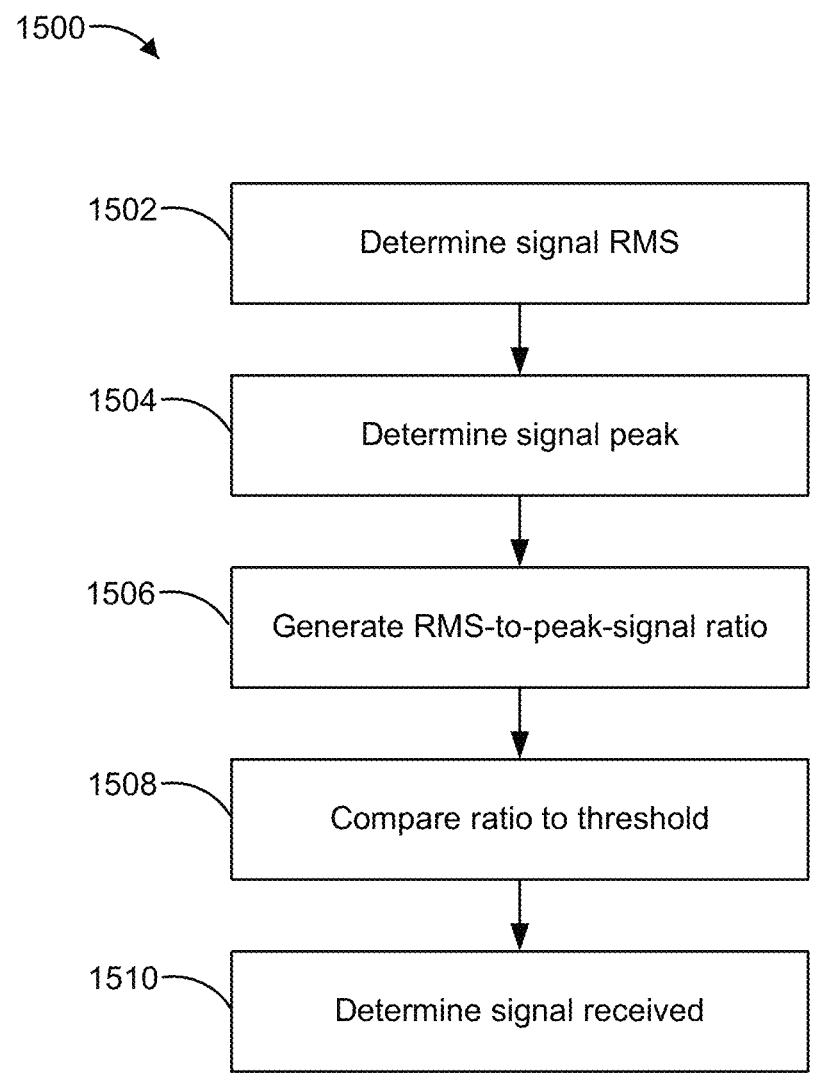
FIG. 15 is a flowchart of an example method for performing signal detection in a calibration operation of FIG. 4.

At operation 478, the sound system 102 operates to detect the audio cue 450 in the sound recording from the operation 436, similar to the operation 438. An example method 1500 for detecting the audio cue 450 may be as shown in FIG. 15. In some embodiments, the sound system 102 analyzes the recording signal 454 and identifies the audio cue signal 1402 in the recording signal 454. In the illustrated example, the three different signals 1102A, 1102B, 1102C in the audio cue signal 1402 are identified from the first detect time (t12), the second detect time (t22), and the third detect time (t32), respectively, in the recording signals 1108A, 1108B, and 1108C.

The detection of the signals 1102 involves the sound system 102 entering a peak detection mode for the calibration procedure. At least during the peak detection mode, the recorded signal is converted from an analog signal to a digital signal, although this conversion is not required as the processes hereinafter may be accomplished with the analog signal. The trigger for detecting the signal 1108 occurs when a signal 1102 is detected that has a RMS-to-peak amplitude ratio greater than some predetermined threshold, e.g. 30 dB. Thus, the RMS 1204 is measured or calculated, in step 1502. Thus, the recorded signal is parsed into predetermined and repeated time periods, for example, 10 ms, which will be used hereinafter for explanation purposes. However, the length of the time period is not limited to 10 ms but may be an amount of time. The recorded signal, during these time periods, is then sampled and converted from analog to digital to generate a series of samples, each sample having a value. Any negative values in the samples may be multiplied by −1. Then, the RMS can be determined during the 10 ms time period. To determine the RMS, every value during the 10 ms time period is squared, all the squared values are added, this sum is divided by the number of samples, and the square root of the quotient is taken to generate the RMS. In other words, the RMS, for n samples, is generated by the following formula:

$$x_{rms} = \sqrt{\frac{1}{n}(x_1^2 + x_2^2 + \ldots + x_n^2)}$$

The system 102 may then determine the peak signal amplitude, in step 1504. The peak amplitude may also be determined for the signal as the highest amplitude of the signal between during the 10 ms period. Generally, the peak signal amplitude 1212 is the absolute maximum value in the series of samples during the 10 ms period. Thus, the greatest value of a sample during the 10 ms is the signal peak.

An RMS-to-peak-signal ratio may then be generated or determined, in step 1506. The RMS-to-peak-signal ratio is a mathematical construction based on the values determined above where the peak signal amplitude in dBs is divided by the RMS in dBs. Generally, the RMS-to-peak-signal ratio is also provided in decibels (dBs). This RMS-to-peak-signal ratio may represent the difference 1216 shown in FIG. 12.

The RMS-to-peak-signal ratio can then be compared to a predetermined threshold, in step 1508. The RMS-to-peak-signal ratio for signal 1108 used in the method 1500 is generally greater than a threshold during the signal's playback. For example, the difference is large enough that the detector recognizes the signal 1108. This RMS-to-peak ratio of the signal 1108 is such that the signal can be detected over background noise. For example, sounds such as rumbles, home noises, most speech, engine noises, etc., generally do not trigger the detector because these signals do not have a RMS-to-peak ratio over the threshold. However, the impulse sounds such as high amplitude clicks, snare drum samples, etc. will trigger the detector. In at least some configurations, the threshold is 30 dBs, although other thresholds are possible.

If the RMS-to-peak-signal ratio is greater than the predetermined threshold, the system 102 determines that the signal 1108 is received, in step 1510. The time of the peak signal may be recognized as the time in which the signal 1108 is received. As explained above, the recorded sounds including the audio cue 1108 can be separated into 10 ms time periods. The first ms period where the RMS-to-peak-signal ratio meets the predetermined threshold may be considered the moment or time when the audio cue 1108 is received. As each sample has a corresponding time stamp, the system 102 can extract the time stamp for the first sample with the RMS-to-peak-signal ratio that meets the predetermined threshold and use that time stamp for the calculations of the delay. As the above time stamp is likely to occur in the first 10 ms time period, any delay between the actual start of the signal and the peak signal amplitude in the first 10 ms time period is small or negligible, for example, less than 10 ms, which has little effect on the computation of the time delay. In some circumstances, the signal 1108 can be evaluated to determine when the signal 1108 started. Thus, the system 102 can determine the signal 1108 is received and then determine when the strong attack portion 1208 of the signal 1108 occurred, and set that time as the signal start. In other circumstances, the system 100 has prior knowledge of the signal 1108 and can decide a different characteristic in the signal to use for measuring the time delay, for example, the signal's overall peak, which can occur in a time period after the first time period, for example, the fourth 10 ms time period. Thus, any portion or part of the signal may be used for detection and to determine the time delay.

As applied herein, the three signals 1102A, 1102B, and 1102C (collectively 1402), each with a plurality of frequencies, a high RMS, and a strong attack of the signal's leading edge are used for the audio cue 450. The time delay is measured between a time position (e.g., a first time position) of the signal 1102 being generated, and a time position (e.g., a second time position) of when an RMS-to-peak ratio of the signal 1108 crosses over a predetermined threshold. The difference between the first time position and the second time position is determined for each signal 1102. Once the time differences are determined for all the signals 1102A-C, an average value of the time differences is calculated and can then be used for the calibration value 456. Various types of average values can be used. In some embodiments, a mean value is used for the average value. In other embodiments, a median is used for the average value. In still other embodiments, a mode is used for the average value.

In the illustrated example of FIGS. 11 and 12, the first signal 1102A is generated at T11 and is being generated with a peak signal amplitude (maximum signal power) 1212 that has a RMS-to-peak ratio, when compared to the signal's RMS value 1204, over the predetermined threshold, e.g., 30 dB. Likewise, when received, the first signal 1108A being recorded also has a RMS-to-peak ratio (representing the difference between 1204 and 1212) above a threshold when received at time T12. A time difference (Dt1) between the time position T11 and the time position T12 of the signal 1102A is then calculated as T12-T11. Similarly, the second signal 1102B is generated at time T21, and the second signal 1108B being recorded has a RMS-to-peak ratio above the threshold for signal 1108B, at time T22. A time difference (Dt2) between the time position T21 and the time position T22 is then calculated as T22-T21. Similarly, the third signal 1102C is generated at time T31, and the third signal 1108C being recorded has a RMS-to-peak ratio above the threshold for signal 1108C, at time T32. A time difference (Dt3) between the time position T31 and the time position T32 is then calculated as T32-T31. Then, a mean average of the time differences (Dt1, Dt2, and Dt3) is calculated as a time delay (Dt), and can be used as the calibration value 456. In other examples, other types of average values, such as median or mode, can be calculated as the time delay (Dt).

The rest of the method described in conjunction with FIG. 6 is then completed as previously described.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of audio cancellation comprising:
   machine-generating an audio cue at a first time;
   playing the audio cue through a sound system in a sound environment, wherein the audio cue is detectable over background noise in the sound environment;
   recording sound in an audio buffer using a microphone, the recording including the audio cue recorded at a second time;
   detecting the audio cue in the recording from the audio buffer over the background noise in the sound environment;
   determining a time delay between the first time of the generation of the audio cue and the second time that the audio cue was recorded in the recording in the audio buffer; and using the time delay to cancel audio from the sound system from subsequent recordings.

2. The method of claim 1, wherein the audio cue has a first root mean square (RMS) higher than a second RMS associated with the background noise.

3. The method of claim 1, wherein the audio cue has a strong attack of less than 100 milliseconds.

4. The method of claim 2, wherein the audio cue comprises two or more frequencies.

5. The method of claim 1, wherein the audio cue emanates from a snare drum.

6. The method of claim 2, wherein the background noise is a person talking.

7. The method of claim 2, wherein the background noise is associated with an operation of a motor vehicle or a room or building where the sound system is located.

8. The method of claim 2, wherein the background noise emanates from an engine, a home appliance, a television, animal noises, wind noise, or traffic.

9. The method of claim 1, wherein the audio cue comprises a plurality of signals, each signal played at a different time.

10. The method of claim 9, wherein the time that the audio cue is detected in the recording occurs is when a peak-to-RMS ratio crosses a predetermined threshold.

11. The method of claim 10, wherein the predetermined threshold is 30 dB.

12. The method of claim 11, wherein the audio cue represents two or more signals, and wherein the method further comprises: averaging the time difference associated with the two or more signals.

13. A media playback system comprising:
a sound system including a media playback device and an audio output device, the media playback device operable to generate a media content signal, and the audio output device configured to play media content using the media content signal; and
wherein the sound system is configured to:
generate an audio cue using the media playback device at a first time;
transmit the audio cue to the audio output device;
play the audio cue through the audio output device;
record sound in an audio buffer using the media playback device, the recording including the audio cue recorded at a second time;
detect the audio cue in the recording from the audio buffer by determining that a peak-to-RMS ratio of the audio cue reaches or crosses a threshold;
determine a time delay between the first time of the generation of the audio cue and the second time that the audio cue was recorded in the recording in the audio buffer; and
play audio content through the audio output device;
receive a user command;
record the user command with the audio content;
determine which audio content has been recorded based on the time delay; and
filter the determined audio content to extract the user command from the recording of the user command with the audio content.

14. The media playback system of claim 13, wherein the media playback device is paired with the audio output device via a wireless communication network, such as BLUETOOTH®.

15. The media playback system of claim 13, wherein the sound system is configured to:
generate a second audio cue and playing the second audio cue through the sound system;
record sound in the audio buffer using the microphone, the recording including the second audio cue;
detect the second audio cue in the recording from the audio buffer by determining that a second peak-to-RMS ratio of the second audio cue crosses the threshold;
determine a second time delay between the generation of the second audio cue and a time that the second audio cue was recorded in the recording in the audio buffer;
determine a difference between the time delay and the second time delay;
determine whether the difference is within a threshold range;
when determined that the difference is within the threshold range, continue to use the time delay to cancel audio from the sound system from subsequent recordings; and
when determined that the difference is not within the threshold range, use the second time delay to cancel audio from subsequent recordings.

16. A method comprising:
generate an audio cue using a media playback device at a first time;
transmit the audio cue to an audio output device;
play the audio cue through the audio output device;
record sound in an audio buffer using the media playback device, the recording including the audio cue recorded at a second time;
detect the audio cue in the recording from the audio buffer by determining that a difference between a peak amplitude of the audio cue and a RMS of background noise, recorded with the audio cue, crosses a threshold;
determine a time delay between the first time of the generation of the audio cue and the second time that the audio cue was recorded in the recording in the audio buffer;
play audio content through the audio output device;
receive a user command;
record the user command with the audio content being played by the media playback device when the user command was received;
determine which audio content has been recorded based on the time delay; and
filter the determined audio content to extract the user command from the recording of the user command with the audio content.

17. The method of claim 16, wherein the audio cue has a strong attack of less than 100 milliseconds.

18. The method of claim 16, wherein the audio cue comprises two or more frequencies.

19. The method of claim 16, wherein the audio cue mimics a sound that emanates from a snare drum.

20. The method of claim 16, wherein the background noise is one or more of: a person talking, associated with an operation of a motor vehicle where the media playback device is located, associated with a room where the media playback device is located, associated with a building where the media playback device is located, emanates from an engine, emanates from a home appliance, emanates from a television, emanates from animal noises, emanates from wind noise, and/or emanates from traffic.

* * * * *

UNITED STATES PATENT AND TRADEMARK OFFICE
CERTIFICATE OF CORRECTION

| | | |
|---|---|---|
| PATENT NO. | : 10,943,599 B2 | Page 1 of 1 |
| APPLICATION NO. | : 16/593539 | |
| DATED | : March 9, 2021 | |
| INVENTOR(S) | : Richard Mitic | |

It is certified that error appears in the above-identified patent and that said Letters Patent is hereby corrected as shown below:

On the Title Page

(72) INVENTORS
"Wagar" should read --Waqar--.

In the Specification

Column 9
Line 49, "Wi-Fi," should read --Wi-Fi®,--.

Column 37
Line 32, "ms" should read --10 ms--.

In the Claims

Column 39
Line 41, Claim 13: "buffer; and" should read --buffer;--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*